(12) United States Patent
Kondo et al.

(10) Patent No.: US 8,619,197 B2
(45) Date of Patent: Dec. 31, 2013

(54) INFORMATION PROCESSING APPARATUS

(75) Inventors: Tetsujiro Kondo, Tokyo (JP); Yuji Okumura, Kanagawa (JP); Tetsushi Kokubo, Chiba (JP); Satoshi Teshigawara, Tokyo (JP)

(73) Assignee: Sony Corporation, Tokyo (JP)

( * ) Notice: Subject to any disclaimer, the term of this patent is extended or adjusted under 35 U.S.C. 154(b) by 1045 days.

(21) Appl. No.: 12/612,090

(22) Filed: Nov. 4, 2009

(65) Prior Publication Data

US 2010/0045818 A1    Feb. 25, 2010

Related U.S. Application Data

(60) Division of application No. 10/631,348, filed on Jul. 31, 2003, now Pat. No. 7,643,096, which is a continuation of application No. 09/743,442, filed as application No. PCT/JP00/03039 on May 11, 2000, now Pat. No. 6,678,328.

(30) Foreign Application Priority Data

May 11, 1999    (JP) .................................... 11-129918

(51) Int. Cl.
*H04N 7/18*    (2006.01)

(52) U.S. Cl.
USPC .......................................... 348/700; 348/699

(58) Field of Classification Search
USPC ................. 348/699–701; 375/240.08–240.17
See application file for complete search history.

(56) References Cited

U.S. PATENT DOCUMENTS

| 4,752,065 | A | 6/1988 | Trumbull |
| 4,857,912 | A | 8/1989 | Everett et al. |
| 5,107,293 | A | 4/1992 | Sekine et al. |
| 5,364,270 | A | 11/1994 | Aoyama et al. |
| 5,486,141 | A | 1/1996 | Ohga et al. |
| 5,496,220 | A | 3/1996 | Engstrand |

(Continued)

FOREIGN PATENT DOCUMENTS

| EP | 0 358 196 | 3/1990 |
| EP | 0 525 961 | 2/1993 |

(Continued)

OTHER PUBLICATIONS

Patent Abstracts of Japan 08-098957, dated Apr. 16, 1996.

*Primary Examiner* — Andy Rao
*Assistant Examiner* — Tyler Edwards
(74) *Attorney, Agent, or Firm* — Frommer Lawrence & Haug LLP; Williams S. Frommer; Ellen Marcie Emas

(57) ABSTRACT

Relationship information is previously generated and stored by learning based on camera motion estimation information expressing motion of a video camera, which is detected by a desired image signal picked up by the video camera, and camera motion information expressing physical motion of the video camera, which was obtained by a sensor for detecting physical motion at the same time when the desired image signal was picked up by the video camera. Camera motion estimation information with respect to an inputted image signal is detected from the inputted image signal. Camera motion prediction information with respect to the inputted image signal is generated, based on the camera motion estimation information detected and the relationship information. Based on the camera motion prediction information, a vibration signal for vibrating an object is generated. As a result, vibration data can be easily generated at low costs, based on existing video assets.

26 Claims, 23 Drawing Sheets

(56) References Cited

U.S. PATENT DOCUMENTS

| | | |
|---|---|---|
| 5,701,522 A | 12/1997 | Terui |
| 5,982,420 A | 11/1999 | Ratz |
| 6,002,428 A | 12/1999 | Matsumura |
| 6,056,362 A | 5/2000 | de la Haye |
| 6,157,677 A * | 12/2000 | Martens et al. .......... 375/240.16 |
| 6,413,090 B1 | 7/2002 | Shiina |
| 6,885,971 B2 * | 4/2005 | Vock et al. .................... 702/182 |
| 7,130,490 B2 | 10/2006 | Elder et al. |
| 7,643,096 B2 * | 1/2010 | Kondo et al. ................. 348/700 |

FOREIGN PATENT DOCUMENTS

| | | |
|---|---|---|
| JP | 2-75284 | 3/1990 |
| JP | 4-58978 | 2/1992 |
| JP | 5-3968 | 1/1993 |
| JP | 5-265372 | 10/1993 |
| JP | 7-20521 | 1/1995 |
| JP | 10-150595 | 6/1998 |
| JP | 11-153949 | 6/1999 |

* cited by examiner

FIG.5

INFORMATION PROCESSING APPARATUS

This is a division of application Ser. No. 10/631,348 filed Jul. 31, 2003, now U.S. Pat. No. 7,643,096, which is a continuation of application Ser. No. 09/743,442 filed Mar. 19, 2001 now U.S. Pat. No. 6,678,328, under 35 USC 371 from International Application PCT/JP00/03039 filed May 11, 2000 and being entitled under 35 USC 119 to a claim of priority to Japanese Application 11-129918 filed in Japan on May 11, 1999, the entirety of which is hereby incorporated herein by reference.

TECHNICAL FIELD

The present invention relates to an information processing apparatus, a learning apparatus, an information processing method, a learning method, and a program recording medium, and particularly to an information processing apparatus, a learning apparatus, an information processing method, a learning method, and a program recording medium, which can generate vibration data to a live feeling experience apparatus. By the live feeling experience apparatus, a user who is appreciating an image picked up by a video camera mounted on a vehicle or the like can experience a live feeling as if the user were riding on the vehicle or the like, in accordance with the vibration data.

BACKGROUND ART

An image picked up by a video camera mounted on a vehicle is displayed on a screen, and simultaneously, the seat of an observer watching the image is vibrated in relation to the image. In this manner, a live feeling experience apparatus has been realized by which the observer can experience a live feeling as if the observer were riding on the vehicle.

Conventionally, vibration data for thus vibrating a seat is obtained by a sensor attached to a vehicle when picking up an image. Otherwise, an operator who is watching an image picked up on a vehicle predicts a vibration and prepares manually vibration data. Further, images are generated by computer graphics, supposing predetermined vibration data.

However, the method of obtaining vibration data by a sensor involves a problem that vibration data cannot be generated from an existing image. In the method in which an operator manually prepares vibration data while watching an image, huge works are required so that the costs are expensive. Further, in the method of preparing an image corresponding to predetermined vibration data by computer graphics, there is a problem as follows. For example, it is not possible to utilize existing video assets in the actual world, in such a manner that a user experiences driving operation of a driver, based on an image previously picked up by a video camera attached to a F1 competition car.

DISCLOSURE OF THE INVENTION

The present invention has been made in view of the conventional situation as described above and realizes easy generation of vibration data at low costs, based on existing video assets.

An apparatus according to the present invention comprises: memory means for storing relationship information generated by learning based on camera motion estimation information expressing motion of a video camera, which is detected by a desired image signal picked up by the video camera, and camera motion information expressing physical motion of the video camera, which was obtained by a sensor for detecting physical motion at the same time when the desired image signal was picked up by the video camera; camera motion estimation information detection means for detecting camera motion estimation information with respect to an inputted image signal, from the inputted image signal; and camera motion prediction information generation means for generating camera motion prediction information with respect to the inputted image signal, based on the camera motion estimation information detected by the camera motion estimation information detection means and the relationship information.

A learning apparatus according to the present invention comprises: camera motion estimation information detection means for detecting camera motion estimation information from a desired image signal picked up by a video camera; and coefficient generation means for generating a conversion coefficient for generating camera motion prediction information expressing motion of the video camera which picked up an arbitrary image signal, from the arbitrary image signal, based on sensor signal expressing physical motion of the video camera, which is obtained by a sensor for detecting physical motion, at the same time when the desired image signal was picked up, and the camera motion estimation information.

An information processing method according to the present invention comprises: a step of generating relationship information generated by learning based on camera motion estimation information expressing motion of a video camera, which is detected by a desired image signal picked up by the video camera, and camera motion information expressing physical motion of the video camera, which was obtained by a sensor for detecting physical motion at the same time when the desired image signal was picked up by the video camera; a step of detecting camera motion estimation information with respect to an inputted image signal, from the inputted image signal; and a step of generating camera motion prediction information with respect to the inputted image signal, based on the camera motion estimation information detected and the relationship information.

A learning method according to the present invention comprises: a step of detecting camera motion estimation information from a desired image signal picked up by a video camera; and a step of generating a conversion coefficient for generating camera motion prediction information expressing motion of the video camera which picked up an arbitrary image signal, from the arbitrary image signal, based on sensor signal expressing physical motion of the video camera, which is obtained by a sensor for detecting physical motion, at the same time when the desired image signal was picked up, and the camera motion estimation information.

A program recording medium according to the present invention records a program for letting a computer execute information, the program comprising: a step of generating relationship information generated by learning based on camera motion estimation information expressing motion of a video camera, which is detected by a desired image signal picked up by the video camera, and camera motion information expressing physical motion of the video camera, which was obtained by a sensor for detecting physical motion at the same time when the desired image signal was picked up by the video camera; a step of detecting camera motion estimation information with respect to an inputted image signal, from the inputted image signal; and a step of generating camera motion prediction information with respect to the inputted image signal, based on the camera motion estimation information detected and the relationship information.

Another recording medium according to the present invention records a program for letting a computer execute learning processing, the program comprising: a step of detecting camera motion estimation information from a desired image signal picked up by a video camera; and a step of generating a conversion coefficient for generating camera motion prediction information expressing motion of the video camera which picked up an arbitrary image signal, from the arbitrary image signal, based on sensor signal expressing physical motion of the video camera, which is obtained by a sensor for detecting physical motion, at the same time when the desired image signal was picked up, and the camera motion estimation information.

BRIEF DESCRIPTION OF THE DRAWINGS

FIG. 5 is a view explaining representative points.

FIG. 25 is a block diagram showing the structure of a computer system which executes learning processing and the like.

BEST MODE FOR CARRYING OUT THE INVENTION

In the following, best mode for carrying out the present invention will be explained in details with reference to the drawings.

Figure 1:
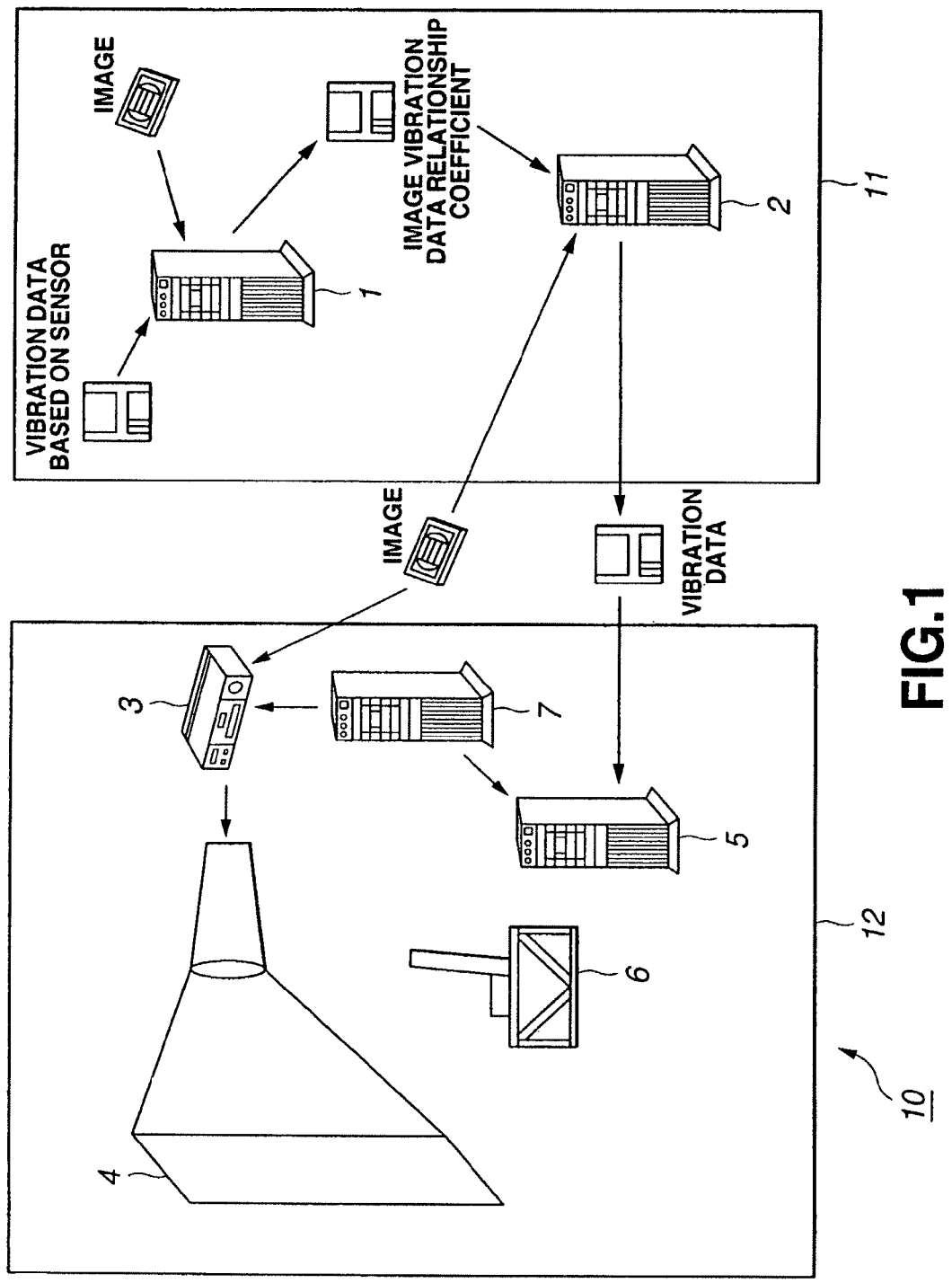
FIG. 1 is a view sowing a structural example of a live-feeling experience apparatus to which the present invention is applied.

For example, the present invention is applied to a live-feeling experience apparatus 10 constructed in a structure as shown in FIG. 1. The live-feeling experience apparatus 10 is comprised of a learning processing section 11 for generating vibration data by learning processing, and an image presentation section 12 for presenting an image while providing physical vibration, based on the vibration data generated by the learning processing section 11.

The learning processing section 11 is comprised of an image/vibration-data relationship learning apparatus 1 and a vibration data generation apparatus 2. The image/vibration-data relationship learning apparatus 1 learns an image/vibration-data relationship coefficient from an image picked up by a video camera mounted on a vehicle and vibration data obtained by a sensor at the same time when the image is picked up. The vibration data generation apparatus 2 generates vibration data, based on the image/vibration-data relationship coefficient outputted from the image/vibration-data relationship learning apparatus 1 and an existing image picked up by the video camera mounted on the vehicle (where the existing image is different from the image used to generate the image/vibration-data relationship coefficient by the image/vibration-data relationship learning apparatus 1).

The image presentation section 1 is comprised of an image presentation apparatus 3, a drive control apparatus 5, a synchronization control apparatus 7, and the like. Vibration data generated by the vibration data generation apparatus 2 in the learning processing section 11 is supplied to the drive control apparatus 5. The image corresponding to the vibration data generated by the vibration data generation apparatus 2 is supplied to the image presentation apparatus 3 constructed by a video tape recorder and the like, for example. The image presentation apparatus 3 reproduces an image recorded on a supplied video tape and displays it on a screen 4. An audience sitting on a seat 6 watches an image displayed on the screen 4. The synchronization control apparatus 7 operates and stops the image presentation apparatus 3 and the drive control apparatus 5, synchronized with each other.

Figure 2:
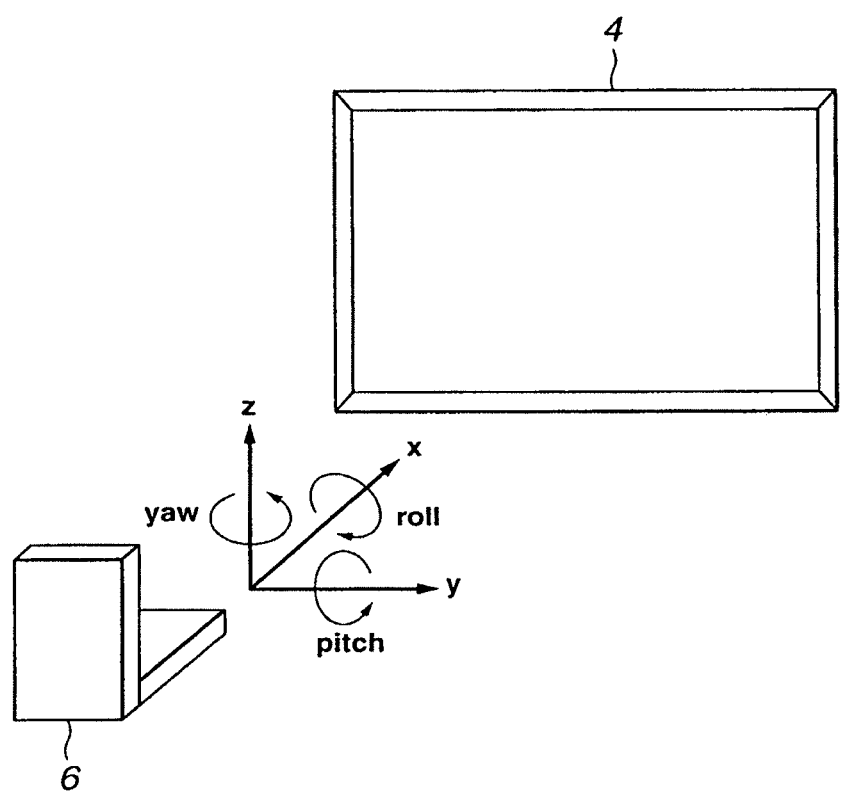
FIG. 2 is a view explaining components of vibration.

FIG. 2 shows a relationship between the screen 4 and the seat 6. In order to let an observer sitting on the seat 6 experience a live feeling as if the observer were riding on a vehicle while watching a image displayed on the screen 4, the drive control apparatus 5 vibrates the seat 6, based on the vibration data. The vibration is constructed by rotation components (roll, pitch, yaw) about three axes X, Y, and Z and translation components (x, y, z) in three axis directions.

Figure 3:
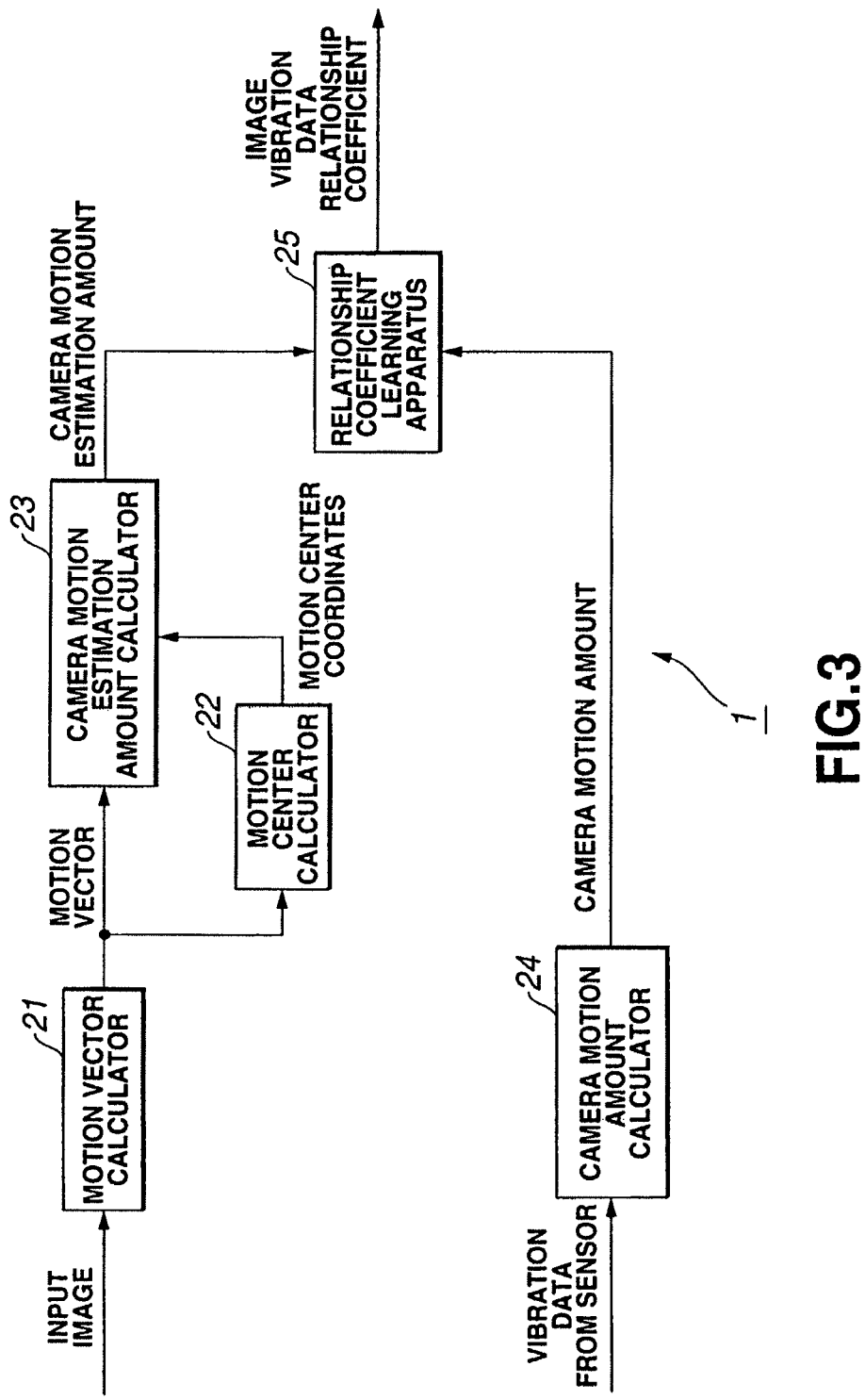
FIG. 3 is a block diagram showing the structure of an image/vibration-data relationship learning apparatus in the live-feeling experience apparatus.

The image/vibration-data relationship learning apparatus 1 is constructed as shown in FIG. 3, for example. With respect to image data inputted in units of frames, a motion vector calculator 21 calculates a motion vectors between a current frame and a past frame preceding the current frame by one frame, based on pixel data items as representative points previously given like grid points so as to include at least points which are vertically and horizontally symmetrical to each other on the entire screen. The motion vector calculator 21 outputs the motion vectors to a motion center calculator 22 and a camera motion estimation amount calculator 23.

For example, with respect to an image of the forward side in the traveling direction, which is picked up by a camera mounted on a car, the motion center calculator 22 obtains coordinates of a motion center of the image on the entire screen (i.e., the infinity point in one-point perspective) and outputs the coordinates to the camera motion estimation amount calculator 23.

The camera motion estimation amount calculator 23 calculates camera motion estimation amounts expressing the position and posture of the video camera per frame, for every component ($v_x$, $v_y$, $v_z$, $w_x$, $w_y$, $w_z$), from relative coordinates of representative points relative to the motion center, motion vectors on the representative points, and a geometrical relationship between a three-dimensional space and a two-dimensional image as a result of picking up the three-dimensional space by the video camera. The number of camera motion estimation amounts to be calculated differs between the components. The camera motion estimation amount calculator 23 then outputs the amounts to the relationship coefficient learning device 25.

A camera motion amount calculator 24 calculates a camera motion amount expressing the amount which the camera actually moved, for every component (x', y', z', roll', pitch', and yaw'), from the vibration data obtained by the sensor such that the camera motion estimation amount corresponds to a physical amount (distance or angle per unit time). The calculator 24 outputs the amounts to the relationship coefficient learning device 25.

For every component, the relationship coefficient learning device 25 learns an image/vibration-data relationship coefficient expressing the correspondence between a plurality of camera motion estimation amounts supplied from the camera motion estimation amount calculator 23 and one camera motion amount supplied from the camera motion calculator 24 and corresponding to the camera motion estimation amounts.

Figure 4:
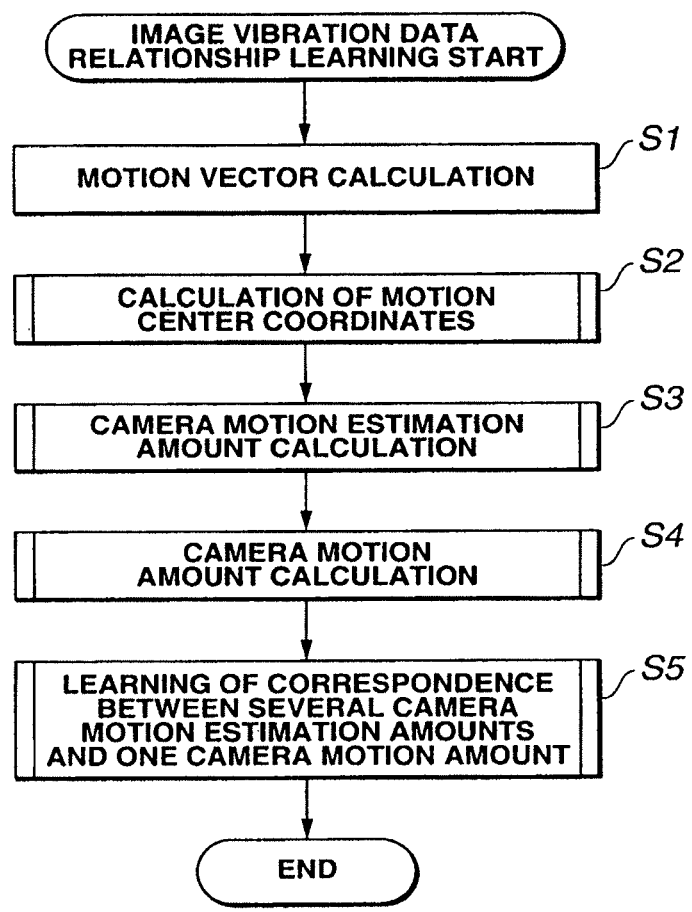
FIG. 4 is a flowchart showing the operation of the image/vibration-data relationship learning apparatus.

Next, the operation will be explained with reference to the flowchart shown in FIG. 4. At first, in the step S1, the motion vector calculator 21 calculates motion vectors at preset representative points between frames in an image from the beginning of a predetermined scene to the end thereof (e.g., an image from when a car starts running to when it stops). For example, as shown in FIG. 5, 4×5 pixels at predetermined positions on grid points over the entire of an image (frame) are assigned to the representative points.

Figure 6:
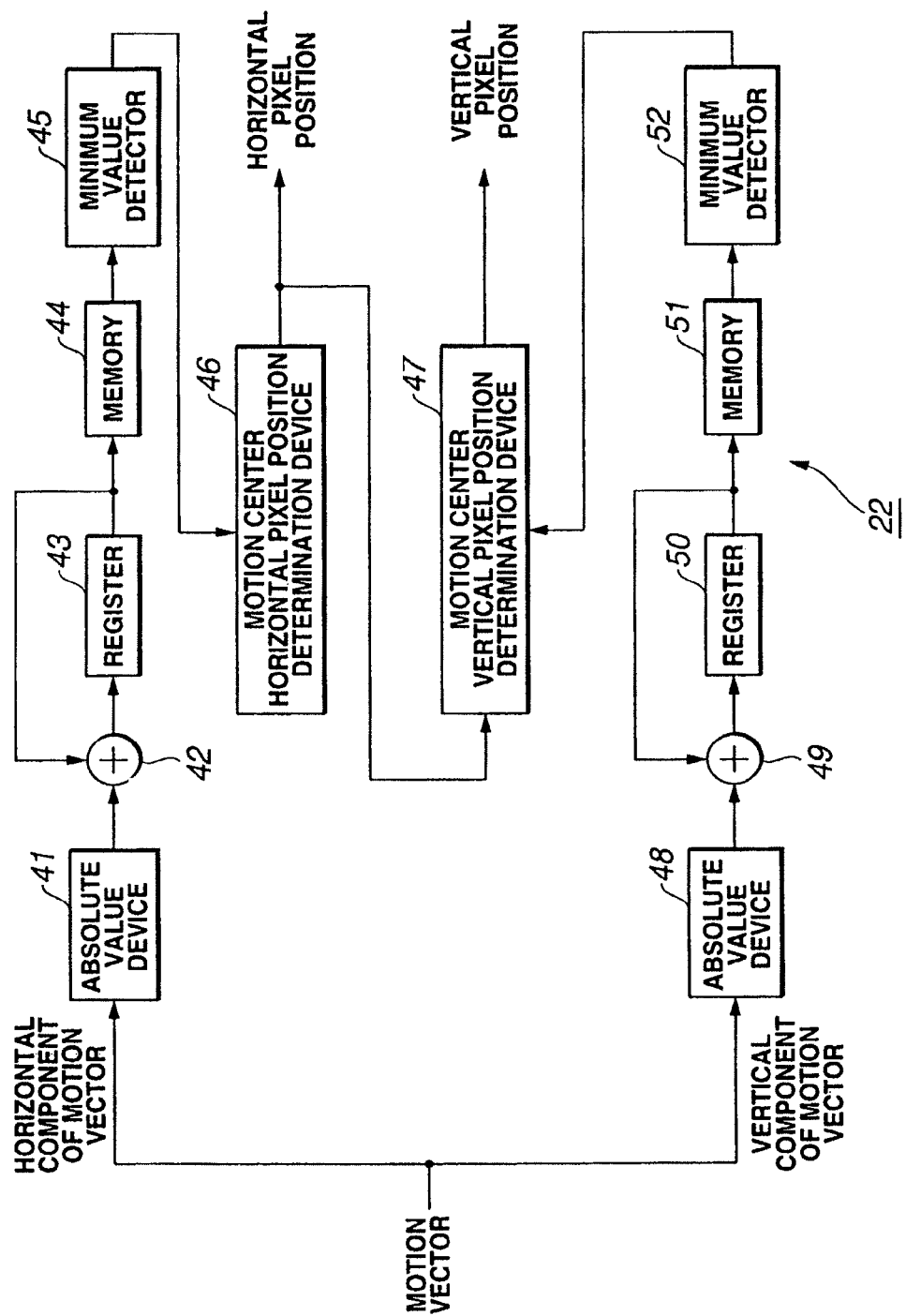
FIG. 6 is a block diagram showing a structural example of a motion center calculator in the image/vibration-data relationship learning apparatus.

The motion vectors calculated by the motion vector calculator 21 are supplied to the motion center calculator 22. In the step S2, the motion center calculator 22 executes processing of calculating motion center coordinates in correspondence with inputted motion vectors. The motion center calculator 22 is constructed as shown in FIG. 6, for example.

An absolute value device 41 obtains an absolute value of the horizontal component of each of motion vectors supplied from the motion vector calculator 21 and outputs them to an adder 42. The adder 42 adds the absolute value inputted from the absolute value device with a value inputted from a register 43, and outputs a result value to the register 43. The register 43 holds the value inputted from the adder 42 and outputs it to a memory 44. The memory 44 stores the value inputted from the register 43, for every representative point.

Figure 5:
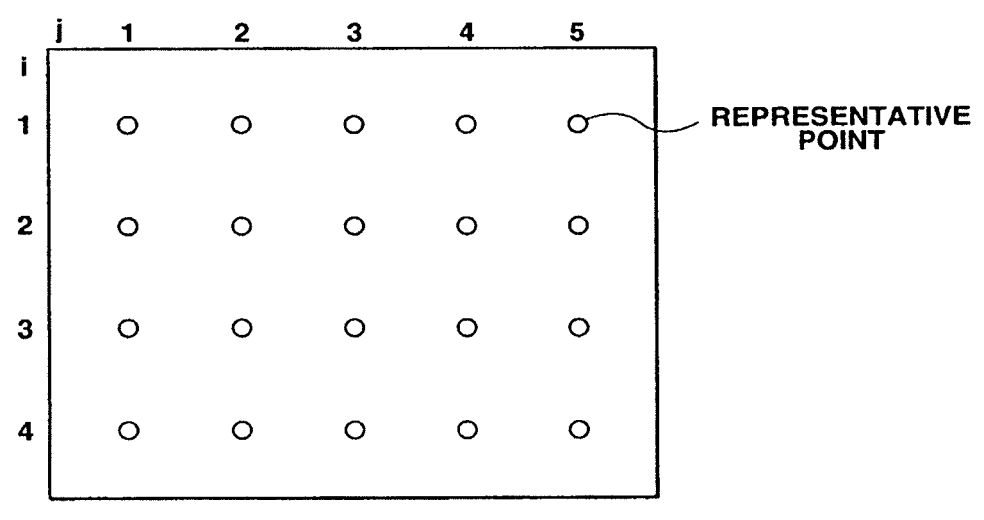

That is, the memory 44 stores, for example, the sum of the absolute values of the horizontal components of the motion vectors at the representative point (i=1, j=1) shown in FIG. 5 from the beginning to the end of a scene. Likewise, the memory 44 also stores sums of absolute values of horizontal components of motion vectors at the other representative points (i, j).

A minimum value detector 45 detects a minimum value among the sums of representative points arranged on each horizontal line, from the sums (hereinafter called also evaluation values) of the absolute values of the horizontal components at the representative points, which are stored in the memory 44. For example, the minimum value detector 55 detects a representative point which has the minimum value among evaluation values corresponding to five representative points on a line of i=1 shown in FIG. 5. Likewise, the minimum value detector 45 also selects a representative point which has the minimum value among evaluation values corresponding to the representative points on each of lines of i=2 to 4.

A motion center horizontal pixel position determination device 46 detects the motion center horizontal position, by majority operation, median operation, averaging operation, and the like, from the horizontal coordinates corresponding to the five representative points having the minimum evaluation values, which are supplied from the minimum value detector 45.

An absolute value detector 48 obtains vertical absolute values of vertical components of motion vectors supplied from the motion vector calculator 21, and outputs them to an adder 49. The adder 49 adds each absolute value supplied from the absolute value device 48 with a value inputted from a register 50, and outputs a result value to the register 50 to hold it. The value held by the register 50 is supplied to the adder 49 and also to the memory 51 which sores the value. The memory 51 stores the sums (hereinafter called also evaluation values) of absolute values of the vertical components of motion vectors at the representative points in each of the frames from the beginning to the end of a scene.

A minimum value detector 52 detects a minimum value for each row (in each line in the vertical direction) among the evaluation values, and outputs the vertical coordinate of the representative point corresponding to each minimum value. For example, in the example shown in FIG. 5, the minimum value detector 52 outputs the vertical coordinate of one representative point having the minimum value among evaluation values to a motion center vertical pixel position determination device 47, for each row of j=1 to 5.

The motion center vertical pixel position determination device 47 selects the vertical coordinate of the representative point corresponding to the horizontal coordinate supplied from the motion center horizontal pixel position determination device 46, among a plurality of vertical coordinate data items inputted from the minimum value detector 52.

Figure 7:
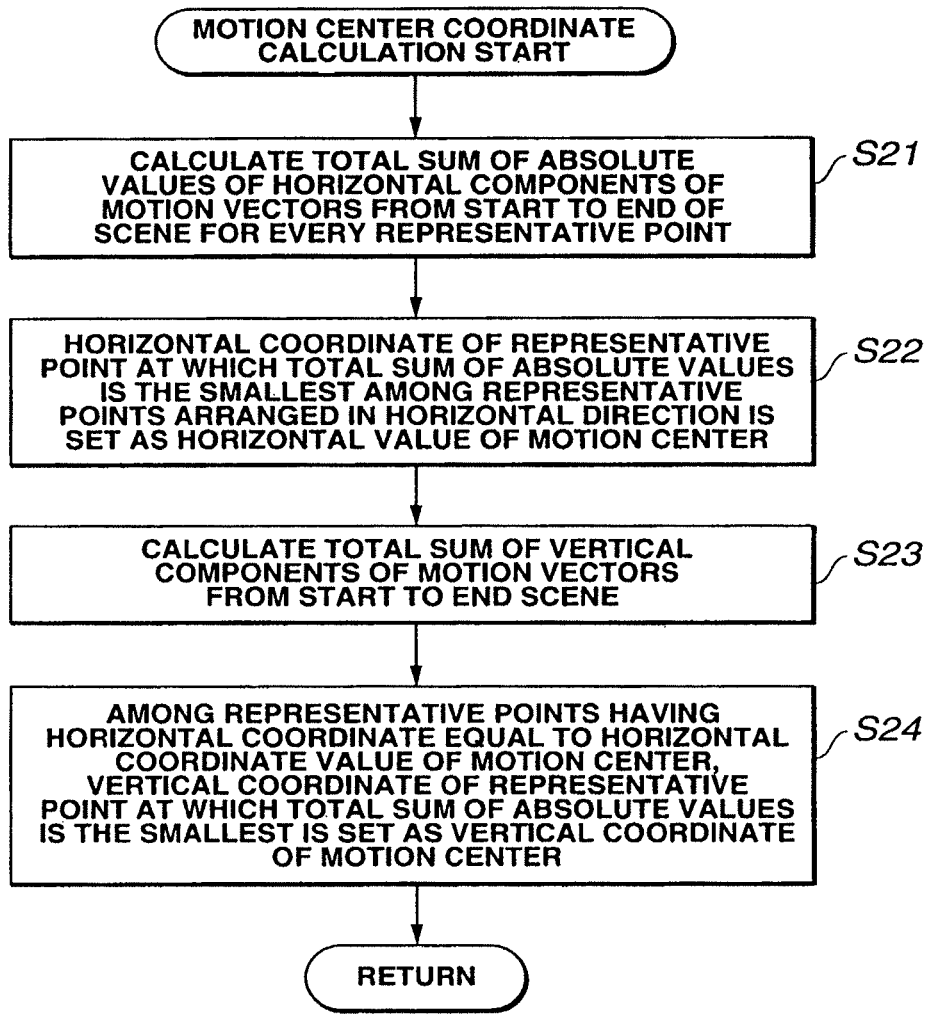
FIG. 7 is a flowchart explaining the operation of the motion center calculator.

Next, with reference to the flowchart shown in FIG. 7, in the step S21, the sum of absolute values of horizontal components of motion vectors is calculated for every representative point. Therefore, the absolute value device 41 obtains absolute values of horizontal components of motion vectors at each representative point, inputted from the motion vector calculator 21, and outputs them to the adder 42. The adder 42 repeats processing of adding a past value held in the register 43 with a value supplied from the absolute value device 41. As a result, the register 43 holds the sum (evaluation value) of absolute values from the beginning to the end of a scene, for every representative point. The sum is stored into the memory 44.

The step S22 executes processing in which the horizontal coordinate of such a representative point that provides the minimum sum of absolute values among representative points arranged in each line in the horizontal direction is taken as the horizontal coordinate of the motion center. Therefore, the minimum value detector 45 detects a minimum value for every line, among the sums (evaluation values) of absolute values of horizontal components of motion vectors at the representative points from the begging to the end of a scene, which are stored in the memory 44.

Figure 8:
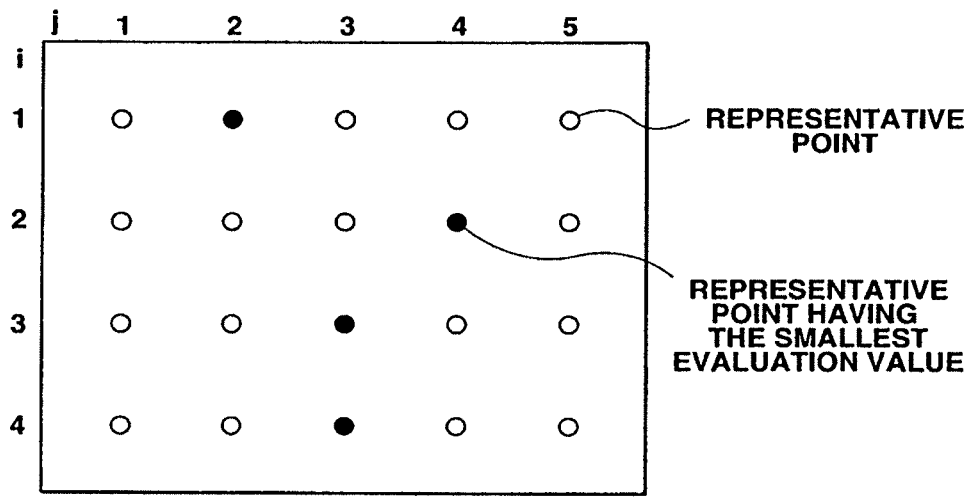
FIG. 8 is a view explaining an evaluation value at a representative point.

For example, as shown in FIG. 8, the smallest one is detected from the evaluation values of the representative points on the line of i=1, and the horizontal coordinate of the detected representative point is outputted to the motion center horizontal pixel position determination device 46. If the evaluation value of the representative point j=2 is the smallest on the line of i=1 in FIG. 8, the horizontal coordinate of the representative point of the coordinate (1, 2) is outputted to the motion center horizontal pixel position determination device. Likewise, if the evaluation values of the representative points at j=4 on the line of i=2, j=3 on the line of i=3, and j=3 on the line of i=4 are respectively the smallest values on these lines, the horizontal coordinates of the representative points (2, 4), (3, 3), and (4, 3) are supplied to the motion center horizontal pixel position determination device 46.

The motion center horizontal pixel position determination device 46 performs processing of majority operation, median operation, averaging operation, or the like on the horizontal coordinate for each line, to decide the motion center horizontal pixel position. In the case according to the majority rule, the horizontal coordinate of j=3 is taken as the motion center horizontal pixel position, since one representative point is selected for each of the rows of j=2 and j=4 and two are selected for the row of j=3 in the example of FIG. 8. In the case according to the median operation, the horizontal coordinate of the representative points of j=3 is taken as the motion center horizontal pixel position, since three representative points exist in three rows of j=2 to 4 and the center row is the row of j=3 in the example of FIG. 8. In the case of the averaging operation, the average value of the horizontal coordinates of the representative points (1, 2), (2, 4), (3, 3), and (4, 3) is taken as the motion center horizontal pixel position, in the example of FIG. 8.

In the step S23, the same processing as taken in the step S21 is executed with respect to the vertical components of motion vectors. That is, absolute values of vertical components are calculated fro the motion vectors supplied from the motion vector calculator 21, and the sum of absolute values is calculated for every representative point. The calculated values are stored into the memory 51. The step S24 executes processing in which the vertical coordinate of such a representative point that has the same horizontal coordinate as the horizontal coordinate of the motion center and that takes the minimum sum of absolute values is taken as the vertical coordinate of the motion center.

Figure 9:
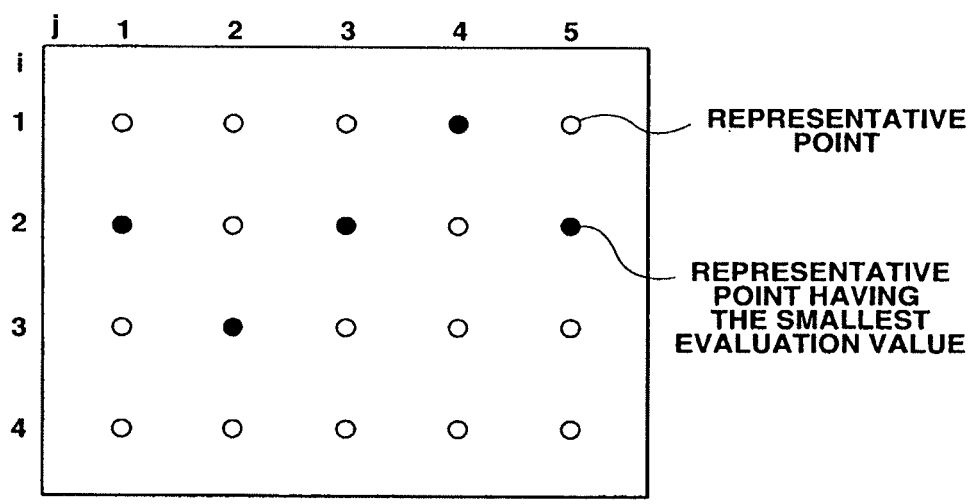
FIG. 9 is also a view explaining an evaluation value at a representative point.

That is, the minimum value detector 52 selects a representative point which has the minimum evaluation value, among representative points in each row, which are stored in the memory 51. For example, as shown in FIG. 9, if the representative points at i=2, i=3, i=2, i=1, and i=1 have respectively the minimum evaluation points on the rows of j=1, j=2, j=3, j=4, and j=5, the vertical coordinates of the representative points (2, 1), (3, 2), (2, 3), (1, 4), and (2, 5) are supplied to the motion center vertical pixel position determination device 47.

The motion center vertical pixel position determination device 47 decides the vertical coordinate of such a representative point that corresponds to the horizontal coordinate of the horizontal pixel position supplied from the motion center horizontal pixel position determination device 46, among the vertical coordinates supplied from the minimum value detector 52. In the cases shown in FIGS. 8 and 9, the horizontal coordinate of the row of j=3 is taken as the horizontal pixel position, and therefore, the vertical coordinate of the representative point (2, 3) is taken as the motion center vertical pixel position.

In the manner as described above, the motion center coordinates calculated by the motion center calculator 22 are supplied to the camera motion estimation amount calculator 23 shown in FIG. 3.

Figure 10:
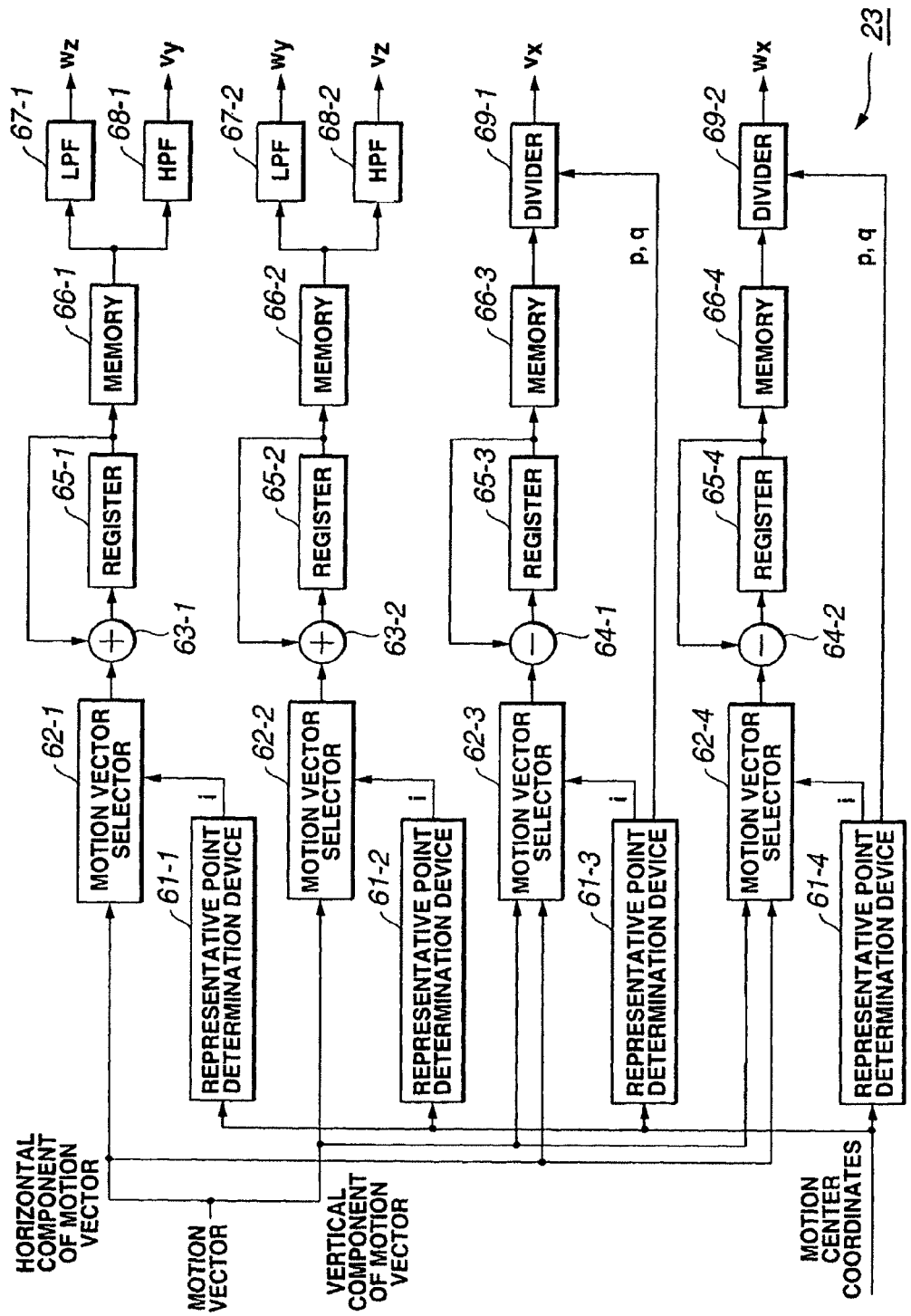
FIG. 10 is a block diagram showing the structure of a camera motion estimation amount calculator in the image/vibration-data relationship learning apparatus.

Returning to FIG. 4, the procedure goes to the step S3 upon completion of the motion center calculation processing in the step S2. Then, camera motion estimation amount calculation processing is executed by the camera motion estimation amount calculator 23. The camera motion estimation amount calculator 23 is constructed as shown in FIG. 10, for example.

A motion vector outputted from the motion vector calculator 21 is inputted to the motion vector selectors 62-1 to 62-4. In the case of this example, the motion vector selectors 62-1 takes in the horizontal component of the motion vector, and the motion vector selector 62-2 takes in the vertical component thereof. The motion vector selectors 62-3 and 62-4 take in both of the horizontal and vertical components.

The motion center coordinates outputted from the motion center calculator 22 are inputted to the representative point position determination devices 61-1 to 61-4. The representative point determination devices 61-1 to 61-4 decide the position of a representative point to which the value of a motion vector to be used for calculation of a camera motion estimation amount should be referred, in correspondence with the component of the camera motion estimation amount to be obtained from the center coordinates of the inputted motion center coordinates. The devices then output it to the motion vector selectors 62-1 to 62-4.

The motion vector selectors 62-1 to 62-4 selects a value of a motion vector to be used for calculation of a camera motion estimation amount, from inputted horizontal or vertical components of motion vectors at all the representative points in one frame interval, based on the representative point position inputted from the representative point position determination devices 61-1 to 61-4. The adders 63-1 and 63-2 respectively adds the outputs of the motion vector selectors 62-1 and 62-2 with the outputs of the registers 65-1 and 65-2, and respectively outputs the results to the registers 65-1 and 65-2. The output of the register 65-1 is outputted to the adder 63-1 and also to a memory 66-1 to store it. From data read from the memory 66-1, the low-band component is extracted by a low-pass filter (LPF) 67-1 and is outputted as a component $w_z$. Also, the high-band component is extracted therefrom by a high-pass filter (HPF) and is outputted as a component $v_y$.

Likewise, the data stored into the register 65-2 is outputted to the adder 63-2 and also to the memory 66-2 to store it. From the data stored into the memory 66-2, the low-band component is extracted by a low-pass filter (LPF) 67-2 and is outputted as a component $w_y$. Also, the high-band component is extracted therefrom by a high-pass filter (HPF) 68-2 and is outputted as a component $v_z$.

A subtracter 64-1 subtracts the output of the register 65-3 from the output of the motion vector selector 62-3, and outputs the result to the register 65-3. The output of the register 65-3 is outputted to the subtracter 64-1 and is also supplied to the memory 66-3 to store it. The data read from the memory 66-3 is inputted to a divider 69-1 and divided by the relative coordinate (p, q) of the representative point outputted from the representative point determination device 61-3. Thereafter, the division result is outputted as a component $v_x$.

Likewise, a subtracter 64-2 subtracts data outputted by the register 65-4 from data outputted by the motion vector selector 62-4, and outputs the result to the register 65-4. Data outputted from the register 65-4 is outputted to the subtracter 64-2 and also to the memory 66-4 to store it. Data outputted from the memory 66-4 is inputted to a divider 69-2 and is divided by the relative coordinate (p, q) of the representative point outputted from the representative point determination device 61-4. Thereafter, the division result is outputted as a component $w_x$.

Figure 11:
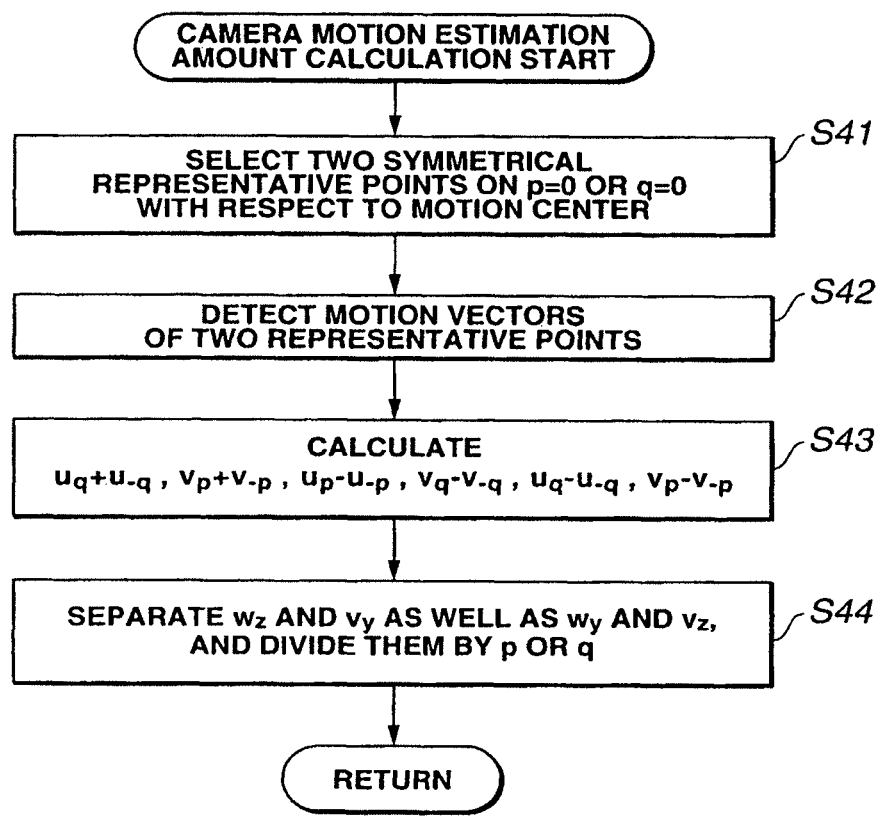
FIG. 11 is a flowchart explaining the operation of the camera motion estimation amount learning apparatus.
Figure 12:
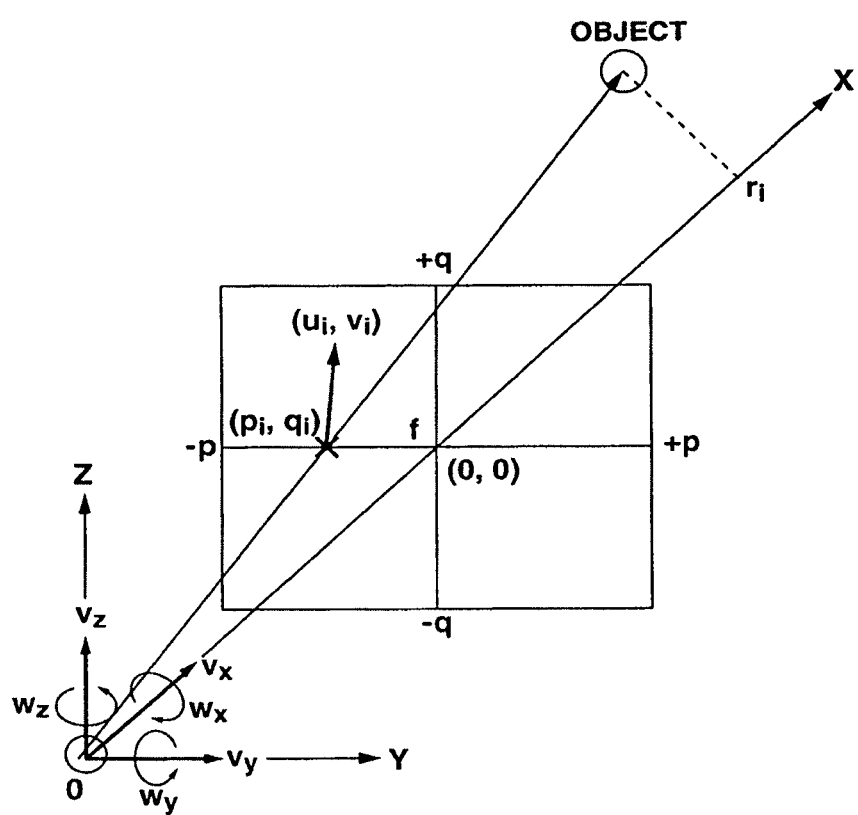
FIG. 12 is a view explaining a geometrical relationship between a three-dimensional space and a two-dimensional image.

Next, operation of the camera motion estimation amount calculator 23 (shown in FIG. 3) will be explained with reference to the flowchart shown in FIG. 11. In this camera motion estimation amount calculation processing, the geometric relationship between a three-dimensional space and a two-dimensional image is utilized as shown in FIG. 12. In FIG. 12, it is supposed that the relative coordinate of a representative point i relative to the motion center (0, 0) is $(p_i, q_i)$, the motion vector at this representative point is $(u_i, v_i)$, the depth of an object on the representative point is $r_i$ when it is viewed from the video camera in the three-dimensional space, the transition speeds of the video camera in the three-axial directions are expressed as $(v_x, v_y, v_z)$, the angular speeds of the video camera about three axes are expressed as $(w_x, w_y, w_z)$, and the focus point of the video camera is f. Then, the next expression is given from the geometric relationship between the three-dimensional space shown in FIG. 12 and the two-dimensional image as a result of picking up the space by a video camera.

That is, the point (Z, Y, X) in the three-dimensional space moves as follows, relatively to the video camera.

$$\begin{pmatrix} \dot{Z} \\ \dot{Y} \\ \dot{X} \end{pmatrix} = -\begin{pmatrix} w_z \\ w_y \\ w_x \end{pmatrix} \times \begin{pmatrix} Z \\ Y \\ X \end{pmatrix} - \begin{pmatrix} v_z \\ v_y \\ v_x \end{pmatrix} \quad (1)$$

The point (Z, Y, X) on a plane X=tZ+sY+r, which corresponds to the screen point (p, q), is expressed as follows.

$$Z = \frac{rq}{f - tq - sp} \quad (2)$$

$$Y = \frac{rq}{f - tq - sp} \quad (3)$$

$$X = \frac{rf}{f - tq - sp} \quad (4)$$

Therefore, the following is obtained.

$$\frac{f}{X} = \frac{f - tq - sp}{r} \quad (5)$$

Also, the relationship expressions of perspective conversion are time-differentiated as follows.

$$p = f\frac{Y}{X} \quad (6)$$

$$q = f\frac{Z}{X} \quad (7)$$

Hence, the followings are obtained.

$$\dot{p} = f\frac{\dot{Y}}{X} - f\frac{Y\dot{X}}{X^2} = \frac{f\dot{Y} - p\dot{X}}{X} \quad (8)$$

$$\dot{q} = f\frac{\dot{Z}}{X} - f\frac{Z\dot{X}}{X^2} = \frac{f\dot{Z} - p\dot{X}}{X} \quad (9)$$

$\dot{X}, \dot{Y}, \dot{Z}, X, Y,$ and $Z$ are erased from the expressions (1), (5), (8), and (9), t=0 and s=0, to obtain the following relationship expressions.

$$u_i \approx \frac{p_i}{r_i}v_x - \frac{f}{r_i}v_y + q_i w_x + \frac{p_i q_i}{f}w_y - \left(f + \frac{p_i^2}{f}\right)w_r \quad (10)$$

$$v_i \approx \frac{q_i}{r_i}v_x - \frac{f}{r_i}v_z + p_i w_x + \left(f + \frac{q_i^2}{f}\right)w_y - \frac{p_i q_i}{f}w_z \quad (11)$$

From the above relationship, camera motion estimation amounts $(v_x, v_y, v_z, w_x, w_y,$ and $w_z)$ are expressed by the next expressions, based on motion vectors at two symmetrical representative points with respect to a motion center (0, 0) on the line p=0 or q=0. In the expressions, objects have an equal depth r at the paired points.

$$w_z + \frac{1}{r}v_y = -\frac{1}{2f}(u_q + u_{-q})(p = 0) \quad (12)$$

$$w_y + \frac{1}{r}v_z = -\frac{1}{2f}(v_p + v_{-p})(q = 0) \quad (13)$$

$$\frac{1}{r}v_x = \begin{cases} \frac{1}{2p}(u_p - u_{-p})(q = 0) \\ \frac{1}{2q}(v_q - v_{-q})(p = 0) \end{cases} \quad (14)$$

$$w_x = \begin{cases} \frac{1}{2q}(u_q - u_{-q})(p = 0) \\ \frac{1}{2p}(v_p - v_{-p})(q = 0) \end{cases} \quad (15)$$

In the above expressions, the vectors at the two representative points which are at symmetrical positions on the line p=0 are respectively expressed as $(u_q, v_q)$ and $(u_{-q}, v_{-q})$, and the motion vectors at the two representative points on the line q=0 are expressed as $(u_p, v_p)$ and $(u_{-p}, v_{-p})$.

The system on the uppermost line (the representative point position determination device 61-1 to the high-pass filter (HPF) 68-1) is to execute the operation of the expression (12). The system on the second line (the representative point position determination device 61-2 to the high-pass filter (HPF) 68-2) is to execute the operation of the expression (13). The system on the third line (the representative point position determination device 61-3 to the high-pass filter (HPF) 69-1) is to execute the operation of the expression (14). The system on the lowermost line (the representative point position determination device 61-4 to the high-pass filter (HPF) 69-2) is to execute the operation of the expression (15).

Figure 13A:
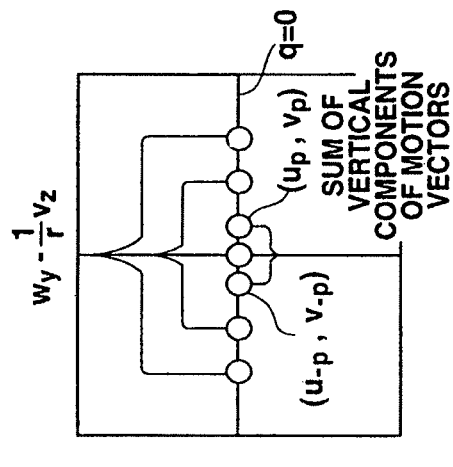
FIGS. 13(A), 13(B), 13(C), and 13(D) are views explaining sets of representative points at symmetrical positions with respect to a motion center.

The representative point position determination device 61-1 is to decide the representative points for executing the operation of the expression (12) described above. As shown in FIG. 13(A), this device decides two representative points which are on the line p=0 and at two symmetrical positions with respect to the motion center.

Figure 13B:
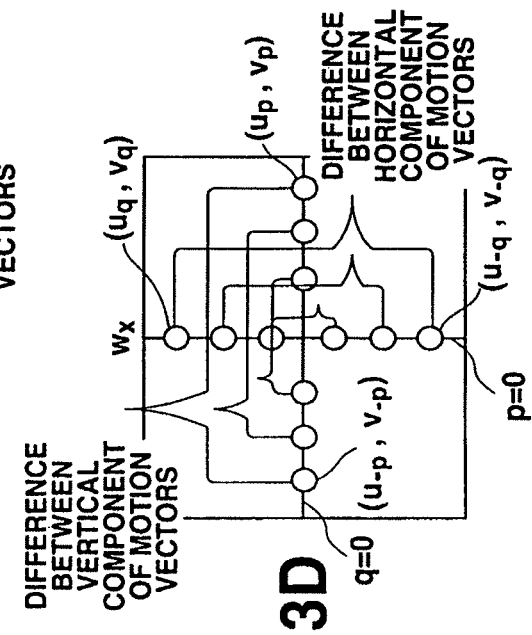

The representative point position determination device 61-2 is to decide the representative points for executing the operation of the expression (13). As shown in FIG. 13(B), this device selects two representative points at two symmetrical positions with respect to the motion center on the line q=0.

Figure 13C:
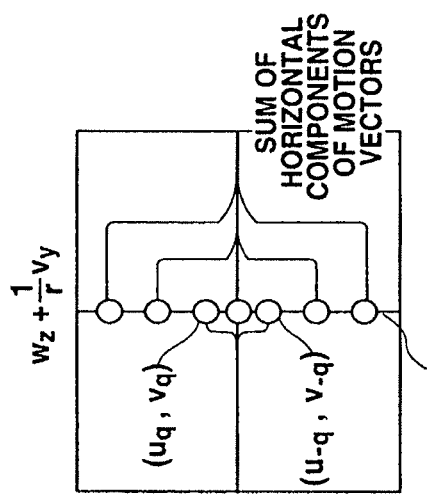

The representative point position determination device 61-3 for executing the operation of the expression (14) selects two symmetrical representative points with respect to the motion center on the line p=0 and two symmetrical representative points with respect the motion center on the line q=0, as shown in FIG. 13(C).

Figure 13D:
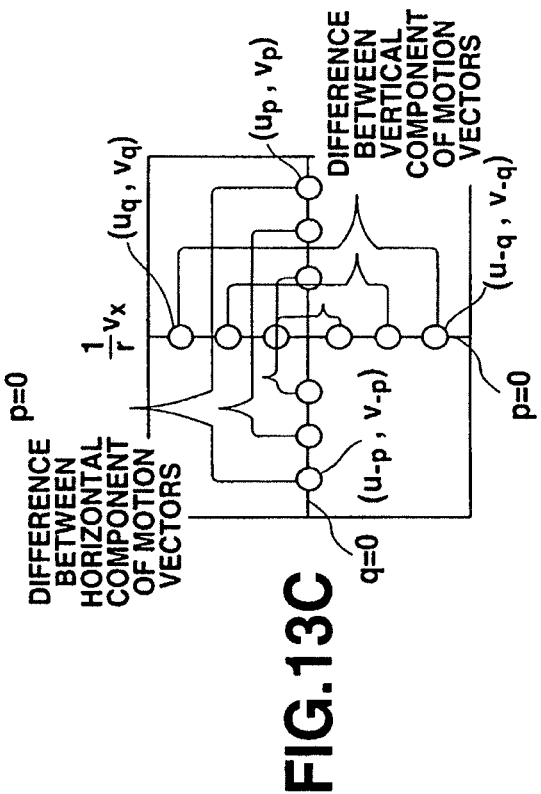

The representative point position determination device 61-4 for executing the operation of the expression (15) selects two representative points on the line p=0 and two representative points on the line q=0, as shown in FIG. 13(D).

Although the representative point position determination device 61-1 may select only the horizontal components of motion vectors at one set of representative points shown in FIG. 13(A), horizontal components of motion vectors at a plurality of sets of representative points are selected for each frame, to ensure higher accuracy. In the example shown in FIG. 13(A), total four sets of representative points are selected. The representative point positioned on the motion center in the center of the figure is treated as two representative points which have equal horizontal components.

Also, the representative point position determination device 61-2 as determination device 61-1, may select only the horizontal components of motion vectors at one pair of representative points shown in FIG. 13(B). However, horizontal components of motion vectors at total four sets of representative points are selected for each frame, to ensure higher accuracy.

The representative point position determination device 61-3 may use any of the upper and lower expressions in the expression (14). However, representative points are selected with use of both the upper and lower expressions, to ensure higher accuracy. In the example of FIG. 13(C), three sets of representative points on the line p=0 and three sets of representative points on the line q=0 are selected.

Likewise, the representative point position determination device 61-4 may use any of the upper and lower expressions in the expression (15). However, both of the upper and lower expressions are used to ensure higher accuracy. In this case, not only three sets of representative points on the line p=0 but also three sets of representative points on the line q=0 are selected as shown in FIG. 13(D), like the case shown in FIG. 13(C).

Returning to FIG. 11, the motion vector selectors 62-1 to 62-4 select several sets of paired representative points decided by corresponding representative point position determination devices 61-1 to 61-4, respectively, in the step S42. In the motion vector selector 62-1 shown in FIG. 10, horizontal components $u_q$ and $u_{-q}$ at two representative points on the line p=0 are selected as motion vectors for operating the expression (12). In the motion vector selector 62-2, vertical components $v_p$ and $v_{-p}$ at two representative points on the line q=0 are selected to perform calculation of the expression (13).

In the motion vector selector 62-3, horizontal components $u_p$ and $u_{-p}$ of motion vectors at two representative points on the line q=0 and horizontal components $v_q$ and $V_{-q}$ of motion vectors at two representative points on the line p=0 are selected to perform calculation of the expression (14). In the motion vector selector 62-4, horizontal components $u_q$ and $u_{-q}$ of motion vectors at two representative points on the line p=0 and horizontal components $v_q$ and $v_{-q}$ of motion vectors at two representative points on the line q=0 are selected to perform calculation of the expression (15).

In the step S43, $u_q+u_{-q}$, $v_p+v_{-q}$, $u_p-u_{-p}$, $v_q-v_{-q}$, $u_q-u_{-q}$, and $v_p-v_{-p}$ used in the expressions (12) to (15) are calculated.

That is, the adder 63-1 is supplied with the horizontal component $u_q$ of the motion vector at the first representative point from the motion vector selector 62-1 and then supplies it to the register 65-1 to store it. When the horizontal component $u_{-q}$ of the motion vector at the next representative point is supplied, the adder 63-1 adds this component with the component $u_q$ held by the register 65-1, and the added value $(u_q+u_{-q})$ is held by the register 65-1.

Data held by the register 65-1 is further supplied to the memory 66-1 to store it.

The adder 63-2 is supplied with the vertical component $v_{-p}$ of the motion vector at the first representative point from the motion vector selector 62-2 and then supplies it to the register 65-2 to store it. When the vertical component $v_p$ of the motion vector at the representative point is supplied next, the adder 63-2 adds this component with the component $v_{-p}$ held by the register 65-2, and the added value $(v_p+v_{-p})$ is supplied to and held by the register 65-2. This data is further supplied to the memory 66-2 to store it.

The subtracter 64-1 is supplied with the horizontal component $u_{-p}$ of the motion vector at the first representative point from the motion vector selector 62-3 and then supplies it to the register 65-3 to hold it. When the horizontal component $u_p$ of the motion vector at the next representative point is supplied, the subtracter 64-1 subtracts the component $u_{-p}$ held by the register 65-3, from the component $u_p$, and the subtracted value $(u_p-u_{-p})$ is held by the register 65-3. This data is supplied from the register 65-3 to the memory 66-3 to store it. Likewise, the value $(v_q-v_{-q})$ is calculated and stored into the memory 66-3.

The subtracter 64-2 is supplied with the horizontal component $u_{-q}$ of the motion vector at the first representative point from the motion vector selector 62-4 and then supplies it to the register 65-4 to hold it. When the horizontal component $u_q$ of the motion vector at the next representative point is supplied, the subtracter 64-2 subtracts the component $u_{-q}$ held by the register 65-4, from the component $u_q$, and the subtracted value $(u_q-u_{-q})$ is supplied to the register 65-4 to hold it. The data held by the register 65-4 is further supplied to the memory 66-4 to store it. Likewise, the value $(v_p-v_{-p})$ is calculated and stored into the memory 66-4.

Next, the procedure goes to the step S44 which executes processing of separating the components $w_z$ and $v_y$, processing of separating the components $w_y$ and $v_z$, and processing of dividing the stored values by the coordinate value p or q of a representative point.

That is, as indicated by the expression (12), the data $(u_q+u_{-q})$ stored in the memory 66-1 is proportional to the sum $(w_z+(1/r)v_y)$ of the components $w_z$ and $v_y$ among the camera motion estimation amounts. As a characteristic of vibration, the translation motion $(v_x, v_y, v_z)$ is constructed mainly by a high-frequency component, and rotation motion $(w_x, w_y, w_z)$ is constructed mainly by a low-frequency component. Therefore, the component wz is obtained by extracting a low-band component from the data $(u_q+u_{-q})$ stored in the memory 66-1, by a low pass filter (LPF) 67-1. The component $v_y$ is obtained by extracting a high-band component by a high-pass filter (HPF) 68-1.

The proportional constant of $(-1/(2f))$ is learned by the learning processing described later.

The data $(v_p+v_{-p})$ stored in the memory 66-2 is proportional to the difference $(w_y-(1/r)w_z)$ between the components $w_y$ and $v_z$, as shown in the expression (13). Hence, a low-band component is extracted from the data stored in the memory 66-2 by a low pass filter 67-2, thereby to extract the component $w_y$. A high-band component is extracted therefrom by a high-pass filter (HPF) 68-2, thereby to extract the component $v_z$.

Also, the proportional constant $(-1/(2f))$ in the expression (13) is previously learned by learning processing.

With respect to the data $(u_p-u_{-p})$ or $(v_q-v_{-q})$ stored in the memory 66-3, a result value obtained by dividing the value by the coordinate p or q is proportional to the component $v_x$. Therefore, when the data $(u_p-u_{-p})$ is read from the memory 66-3, the divider 69-1 divides this data, based on the horizontal coordinate p of the representative point supplied from the representative point position determination device 61-3. The divider 69-1 outputs the division result. Also, when the data $(v_q-v_{-q})$ is read from the memory 66-3, this data is divided by the vertical coordinate supplied from the representative point position determination device 61-3 and outputted.

Likewise, when the data $(u_q-u_{-q})$ is read from the memory 66-4, the divider 69-2 divides the value by the vertical component q of the relative coordinated supplied from the representative point position determination device 61-4, to make the value proportional to the component $w_x$. Also, when the data $(v_p-v_{-p})$ is supplied, the divider 69-2 divides this value by the vertical component p of the relative coordinate supplied from the representative point position determination device 61-4.

The component $(1/r)$ in the expression (14) is processed by learning and is included into the weight coefficient. The component (½) in the expression (15) is also processed by learning.

Thus, the camera motion estimation amount calculated by the camera motion estimation amount calculator 23 shown in FIG. 3 is supplied to the relationship coefficient learning device 25.

Figure 14:
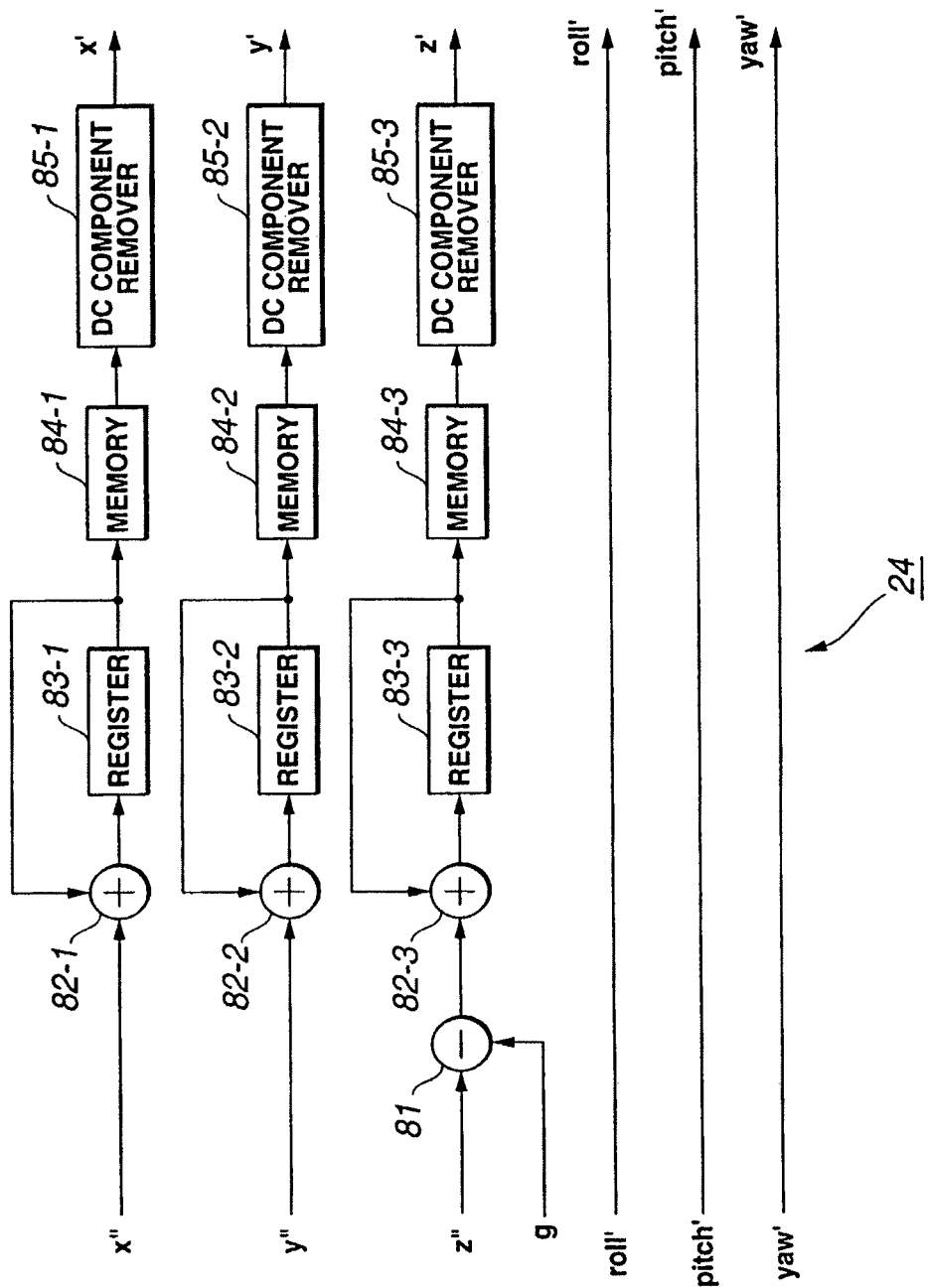
FIG. 14 is a block diagram showing the structure of a camera motion amount calculator in the image/vibration-data relationship learning apparatus.

Returning to FIG. 4, camera motion estimation amount calculation processing is executed in the step S3. Next, in the step S4, camera motion amount calculation processing is executed by the camera motion amount calculator 24 shown in FIG. 3. The camera motion amount calculator 24 is constructed as shown in FIG. 14, for example.

Vibration data from a sensor not shown is constructed by accelerations (x", y", z") in three axial directions and angular speeds (roll', pitch', yaw') of rotations about three axes. The accelerations x", y", z" are respectively inputted to accelerators 82-1 and 82-2 and a subtracter 81. The adder 82-1 adds the inputted acceleration x" with the value stored in the register 83-1, thereby to make integration, and outputs the result to the register 83-1. The output of the register 83-1 is outputted to the adder 82-1 and is also supplied to the memory 84-1 to store it. A DC component remover 85-1 removes a DC (Direct Current) component from the data stored in the memory 84-1 and outputs the result as the component x' of the camera motion amount. Errors are superimposed on the vibration data obtained from the sensor. Consequently, errors are compiled if the vibration data is simply subjected integration. Therefore, the DC component is removed from the value integrated by the DC component remover 85-1.

The adder 82-2 adds a past value held by the register 83-2 to the inputted sensor output y", and outputs the result to the register 83-2. Thus, the sensor output y" is integrated and the result is outputted to the memory 84-2 to store it. The DC component remover 85-2 removes a DC component from data read out by the memory 84-2, and outputs it as the component y' of the camera motion amounts.

The subtracter 81 subtracts the gravity acceleration g from the sensor output z", and outputs the result to the adder 82-3. The adder 82-3 adds a past value held by the register 83-3 to the input from the subtracter 81, and outputs the result to the register 83-3. Thus, the data (z"-g) is integrated and supplied to the memory 84-3 to store it. After a DC component is removed by a DC component remover 85-3 from the data stored in the memory 84-3, the data is outputted as the component z' among the camera motion amounts.

Among data from the sensor, the angular speeds (roll', pitch', yaw') are directly outputted as components (roll', pitch', yaw') of the camera motion amounts.

Figure 15:
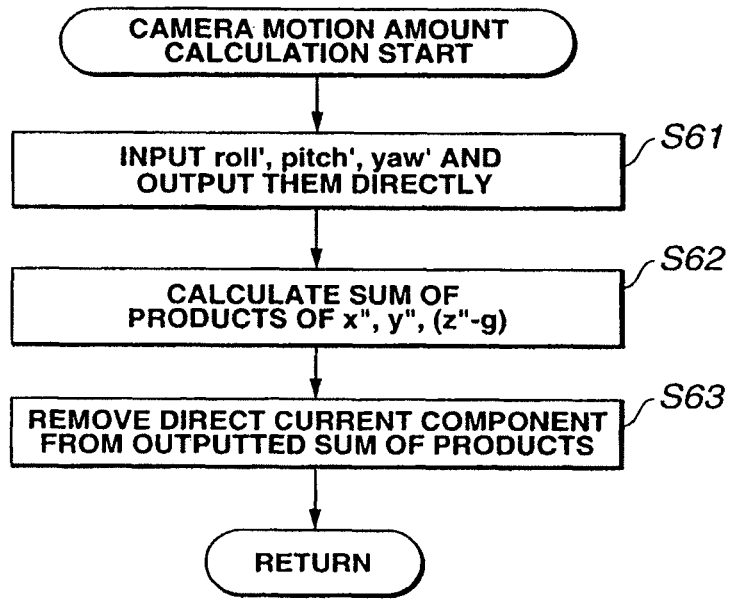
FIG. 15 is a flowchart explaining the operation of the camera motion amount calculator.

Next, with reference to the flowchart shown in FIG. 15, the operation of the camera motion amount calculator 24 shown in FIG. 14 will be explained. In the step S61, the vibration data items roll', pitch', and yaw' from the sensor are inputted. These data items are then outputted directly to the relationship coefficient learning apparatus 25.

Next, in the step S62, integration processing is executed on the three components of translation motion, according to the following expressions, such that the camera motion estimation amount calculator and the physical amount (speed) correspond to each other.

$$x'=\acute{O}x'' \quad (16)$$

$$y'=\acute{O}y'' \quad (17)$$

$$z'=\Sigma(z''-g) \quad (18)$$

That is, the adder 82-1 and the register 83-1 work together to integrate the sensor output x", and output the result to the memory 84-1 to store it. Likewise, the adder 82-2 and the register 83-2 work together to integrate the sensor output y", and output the result to the memory 84-2 to store it. Further, the adder 82-3 and the register 83-3 integrate the value (z"-g) inputted from the subtracter 81, and supply the result to the memory 84-3 to store it.

The step S63 executes processing for removing direct current components from the integration outputs obtained in the step S63. That is, the DC components removers 85-1 to 85-3 respectively remove direct current components from data items stored in the memories 84-1 to 84-3 and output them as components x', y', and z' of the camera motion amounts.

The camera motion amounts (x', y', z', roll', pitch', yaw') calculated by the camera motion amount calculator 24 are supplied to the relationship coefficient learning device 25.

Figure 16:
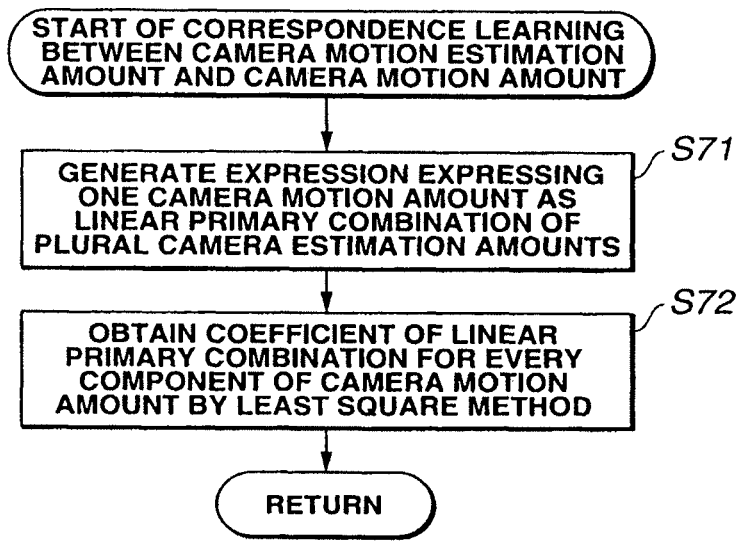
FIG. 16 is a flowchart explaining the details of learning of correspondence between camera motion estimation amounts and a camera motion amount.

Returning to FIG. 4, the camera motion amount calculation processing is completed in the step S4. Then, the procedure goes to the step S5, learning processing for the correspondence between a plurality of camera motion estimation amounts and one camera motion amount is executed by the relationship coefficient learning device 25. The details of the processing made by the relationship coefficient learning device 25 are shown in the flowchart of FIG. 16.

That is, firstly in the step S71, the camera motion estimation amounts $(v_x, v_y, v_z, w_x, w_y, w_z)$ calculated by the camera motion estimation amount calculator 23 cannot be obtained accurately with respect to all the sets of symmetrical points, because of errors in motion vector detection, mixture of motions of small objects, lack of symmetry of the supposed three-dimensional space, and the like. Also infinite are the focus distance f of the camera, the depth r of the target object, and the conversion coefficient between the unit of camera motion estimation amounts (pixel/frame-cycle) and the unit of camera motion amounts (m/s and rad/s). Therefore, one camera motion amount is expressed by a linear primary combination of plural camera motion estimation amounts, to obtain the coefficient.

For example, among the camera motion amounts, a component x' and n camera motion estimation amounts $v_{x1}$ to $v_{xn}$ can be related with each other by the next expression using a linear primary combination.

$$X' = w_{x0} + w_{x1}v_{x1} + w_{x2}v_{x2} + \ldots + w_{xn}v_{xn} \quad (19)$$

Figure 17:
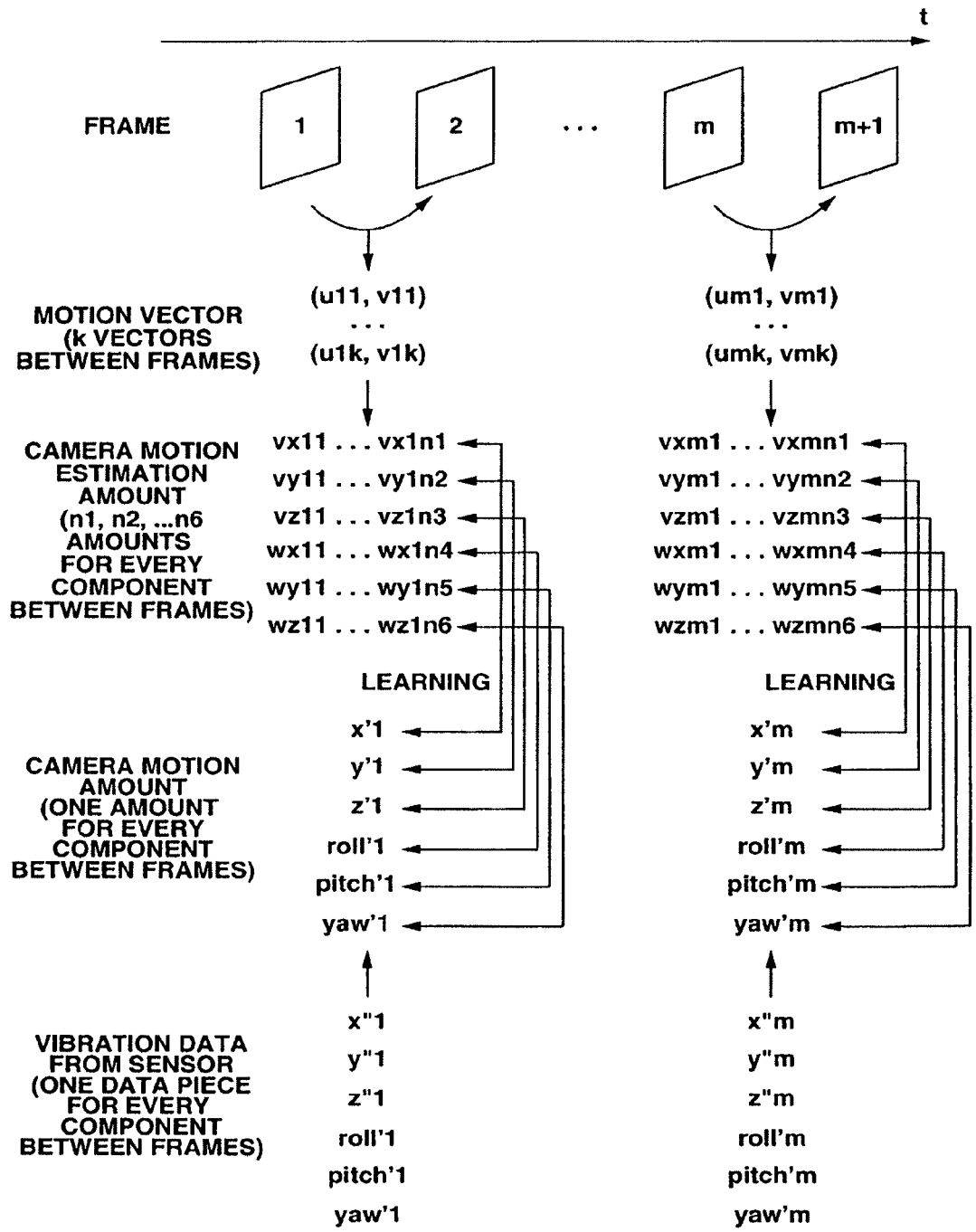
FIG. 17 is a view schematically showing the correspondence relationship between the components of the camera motion estimation amounts.

Therefore, as FIG. 17 schematically shows the correspondence relationship between the components of the camera motion estimation amounts, the next expression is satisfied because m sets of camera motion estimation amounts are calculated when an image from the beginning to the end of one scene is constructed by m+1 frames.

$$\begin{pmatrix} x'1 \\ x'2 \\ \vdots \\ x'm \end{pmatrix} = \begin{pmatrix} 1 & v_{x11} & v_{x12} & \ldots & v_{x1n} \\ 1 & v_{x21} & v_{x22} & \ldots & v_{x2n} \\ \vdots & & \ddots & & \vdots \\ 1 & v_{xm1} & v_{xm2} & \ldots & v_{xmn} \end{pmatrix} \begin{pmatrix} w_{x0} \\ w_{x1} \\ \vdots \\ w_{xn} \end{pmatrix} \quad (20)$$

Although only the component x' has been explained above among the camera motion amounts, the same explanation applies also to the other components y', z', roll', pitch', and yaw'.

Next, in the step S72, the expression generated in the step S71 is solved by a least square method, thereby to execute processing for obtaining coefficients $w_{x0}$ to $w_{xn}$ of the linear primary combination for every component of the camera motion amounts. For example, in case of obtaining coefficients $w_{x0}$ to $w_{xn}$ with respect to the component x' of the camera motion amounts, the coefficients $w_{x0}$ to $w_{xn}$ of the linear primary combination is obtained by the least square method such that the error between the left side of the expression (20) and the camera motion amount component x' is minimized.

The same operation as described above is carried out with respect to the other components y', z', roll', pitch', and yaw' of the camera motion amounts.

In the manner described above, the image/vibration-data relationship coefficient learned by the relationship coefficient learning device 25 is supplied to the vibration data generation apparatus 2 shown in FIG. 1.

Figure 18:
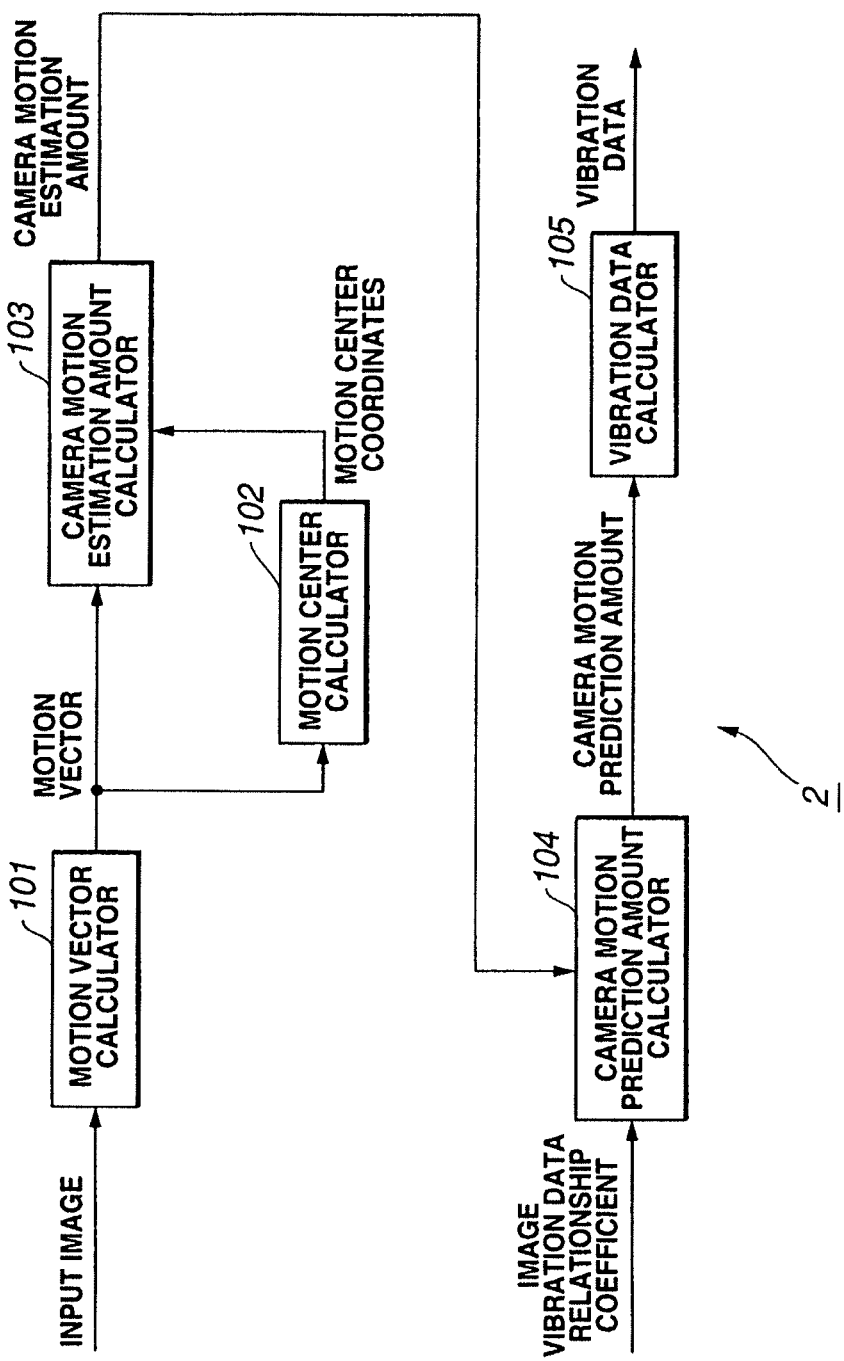
FIG. 18 is a block diagram showing the structure of a vibration data generation apparatus in the live-feeling experience apparatus.

FIG. 18 shows a structural example of the vibration data generation apparatus 2. A motion vector calculator 101 detects a motion vector from inputted image (supplied to the image presentation apparatus 3), and outputs it to a motion center calculator 102 and a camera motion estimation amount calculator 103. The motion center calculator 102 calculates motion center coordinates of the inputted image, based on the inputted motion vector, and outputs it to the camera motion estimation amount calculator 103. The camera motion estimation amount calculator 103 calculates a camera motion estimation amount, based on the motion vector inputted from the motion vector calculator 101 and the motion center coordinates supplied from the motion center calculator 102, and outputs it to a camera motion prediction amount calculator 104. The motion vector calculator 101, the motion center calculator 102, and the camera motion estimation amount calculator 103 have the same structures and functions as the motion vector calculator 21, the motion center calculator 22, and the camera motion estimation amount calculator 23 explained in FIG. 3.

The camera motion prediction amount calculator 104 calculates a linear primary combination of an image vibration data relationship coefficient supplied from the image/vibration-data relationship learning apparatus 1, and a camera motion estimation amount supplied from the camera motion estimation amount calculator 103, thereby to calculate a camera motion prediction amount expressing information by which the video camera is considered to have moved in one frame cycle. The calculator 104 outputs the amount to a vibration data calculator 105. From the inputted camera motion prediction amount, the vibration data calculator 105 calculates such vibration data that has a physical amount equal to that of vibration data applied when the drive control apparatus 5 and the seat 6 are translated or rotated.

Figure 19:
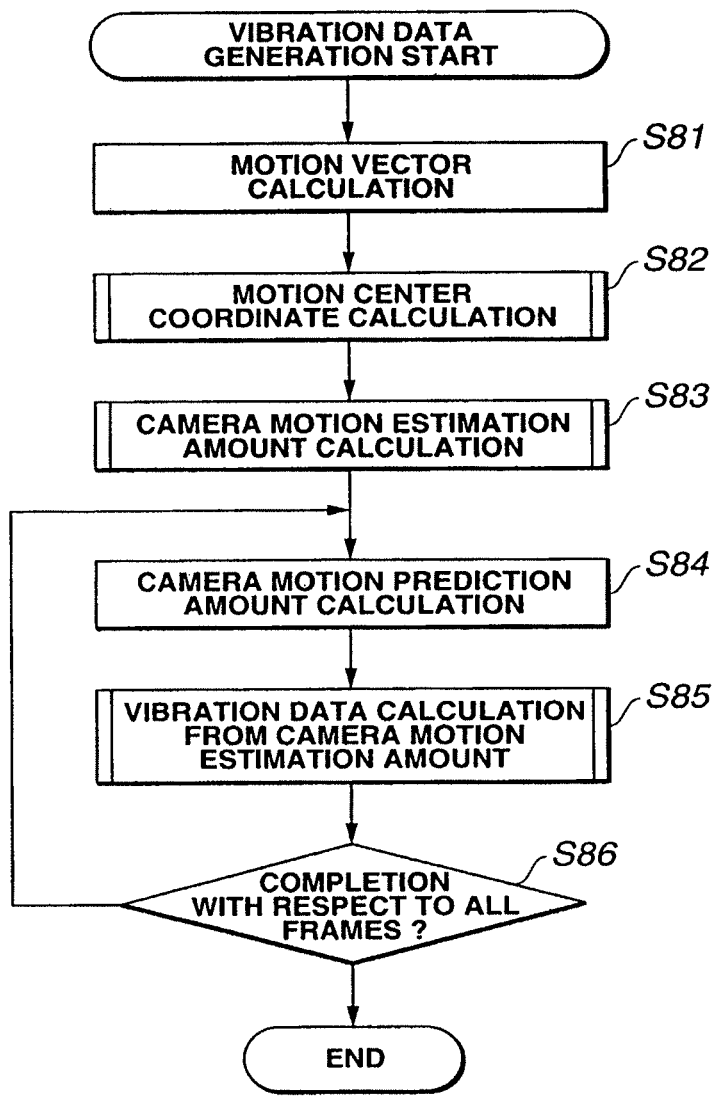
FIG. 19 is a flowchart showing the operation of the vibration data generation apparatus.

Next, operation of the vibration data sown in FIG. 18 will be explained with reference to the flowchart shown in FIG. 19. In the step S81, motion vector calculation processing is executed by the motion vector calculator 101. In the step S82, motion center coordinate calculation processing is executed by the motion center calculator 102. In the step S83, camera motion estimation amount calculation processing is executed by the camera motion estimation amount calculator 103. The processing from the step S81 to the step S83 is the same as the processing from the step S1 to the step S3 in FIG. 4, and explanation thereof will be omitted herefrom.

Next, in the step S84, calculation processing for camera motion amounts is executed by the camera motion prediction amount calculator 104.

Figure 20:
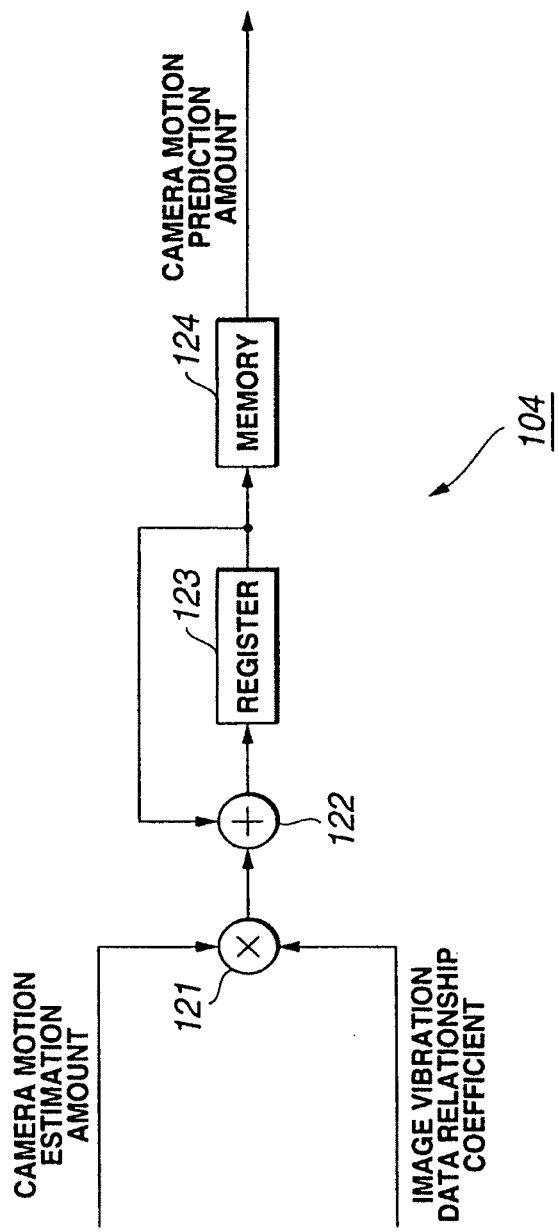
FIG. 20 is a block diagram showing the structure of a camera motion prediction amount calculator in the vibration data generation apparatus.

The camera motion prediction amount calculator 104 is constructed, for example, as shown in FIG. 20.

The camera motion prediction amount calculator 104 comprises a multiplier 121, an adder 122, and a memory 124. The multiplier 121 multiplies a camera motion estimation amount supplied from the camera motion estimation amount calculator 103 and an image/vibration-data relationship coefficient supplied from the image/vibration-data relationship learning apparatus 1, and outputs the result to the adder 122. The adder 122 adds data inputted from the multiplier 121 and past data held by the register 123, and outputs the result to the register 123, thereby to integrate the inputted data. The memory 124 stores data supplied from the register 123 and outputs the data as a camera motion prediction amount.

Further, the camera motion prediction amount calculator 104 performs processing of multiplying the camera motion estimation amount and the image/vibration-data relationship coefficient, and adding the result.

That is, the multiplier 121 multiplies a camera motion estimation amount supplied from the camera motion estimation amount calculator 103 and an image/vibration-data relationship coefficient supplied from the image/vibration-data relationship learning apparatus 1, and outputs the result to the adder 122. The adder 122 adds data held by the register 123 in the past to the data inputted from the multiplier 121, and makes the register 123 store the result. Thus, the data supplied from the multiplier 121 is integrated. In this manner, a linear primary combination is calculated. Data outputted from the register 123 is once held in the memory 124 and is thereafter outputted as a camera motion prediction amount.

Suppose that camera motion estimation amounts calculated by the camera motion estimation amount calculator 103 are $v_{xi1}, v_{xi2}, \ldots, v_{xin}$ during a time i between two frames, for example. The coefficients $w_{x0}, w_{x1}, w_{x2}, \ldots, w_{xn}$ of a linear primary combination are values that have taken into consideration all of the errors in motion vector detection, the focus distance f of the camera, the depth r of the object, and the conversion coefficient between the unit of camera motion estimation amounts and the unit of camera motion amounts.

Accordingly, the camera motion prediction amount calculator $X'_i$ can be obtained by calculating the linear primary combination of a plurality of camera motion estimation amounts obtained at the time i between two frames.

$$X'_i = w_{x0} + w_{x1}v_{xi1} + \ldots + w_{xn}v_{xin} \tag{21}$$

The camera motion prediction amount X' at each time is obtained by performing the above calculation from the beginning to the end of a scene.

By the same processing as described above, the other components Y', Z', ROLL', PITCH', and YAW' are calculated.

Further, the procedure goes to the step S85 upon completion of the calculation processing for the camera motion prediction amount in the step S84.

In the step S85, a vibration data calculator 105 executes processing for calculating vibration data from camera motion prediction amounts.

Further, in the next step S86 the vibration data calculator 105 determines whether or not processing of the steps S84 and S85 has been carried out for all frames. If there is any unprocessed frame, the procedure returns to the step S84 and camera motion prediction amount calculation processing is carried out for the unprocessed frame. The processing from the step S84 to the step S86 is repeated for every frame until the processing is carried out for all frames. Then, generation processing for generating vibration data is complete.

Vibration data will now be explained below.

Based on the camera motion prediction amounts calculated as described above, the vibration data calculator 105 generates vibration data. The drive control apparatus 5 drives the seat 6, based on the vibration data. However, the seat 6 cannot be infinitely rotated or translated actually because of the limitation that the vibration data must be presented by the seat 6 which is fixed to a specific place such as a theater or the like.

Hence, in the live-feeling experience apparatus 10, the vibration data is constructed by actual vibration data as data which directly provides actual angular or positional changes, and substituent vibration data which provides angular or positional changes in a pulse-like or step-like manner in accordance with the change of the rotation angular-speed or the translation speed.

For example, actual vibration data and substituent vibration data are constructed as shown in the following table 1 in case where a car is let run along a road surface.

TABLE 1

Table of Actual Vibration Data and Substituent Vibration Data

| Vibration Component | Actual Vibration Expressed Physical Amount | Substituent Vibration | Expressed Physical Amount |
|---|---|---|---|
| pitch | Longitudinal Inclination of Road Surface | pitch | Inertial Force of Acceleration/ Deceleration | $x''$ |
| roll | Lateral Inclination of Road surface | roll | Centrifugal Force on Curve | $x', yaw'$ |
| yaw |  |  | Car Head Swing on Curve | $yaw'$ |
| x | Longitudinal Vibration | x |  |  |
| y | Lateral Vibration | y |  |  |
| z | Vertical Vibration | z |  |  |

Cited as actual data may be the longitudinal inclination of the road surface, the lateral inclination of the road surface, the vibration in the longitudinal direction, the vibration in the lateral direction, and the vibration in the vertical direction. The longitudinal inclination is expressed by the vibration component pitch. The lateral inclination or the road surface is expressed by the vibration component roll. The vibrations in the longitudinal, lateral, and vertical directions are expressed by the vibration components x, y, and z.

Cited as substituent data may be the inertial force caused by acceleration/deceleration, the centrifugal force on curve, and the head swing of the car on curve. The inertial force caused by acceleration/deceleration is expressed by a double-differentiated value $x''$ of the vibration component x. The centrifugal force on curve is expressed by $x'yaw'$ which is a product of the differentiated value $x'$ of the vibration component x and the differentiated value $yaw'$ of the vibration component yaw. The head swing of the car on curve is expressed by the differentiated value $yaw'$ of the vibration component yaw.

The inertial force caused by acceleration/deceleration corresponds to the vibration component pitch. The centrifugal force on curve corresponds to the vibration component roll. The head switching of the car on curve corresponds to the vibration component yaw.

The actual vibration components $pitch_r$, $roll_r$, $yaw_r$, $x_r$, $y_r$, and $z_r$, shown in the table 1, of the vibration components pitch, roll, yaw, x, y, and z are calculated as follows.

The actual vibration component $pitch_r$ is calculated as follows.

$$pitch_r = LPF(\Sigma PITCH') \tag{22}$$

That is, this component is obtained by calculation of attaining a low-band component LPF ($\Sigma PITCH'$) from the integration $\Sigma PITCH'$ of the camera motion prediction amount PITCH'.

Also, the actual vibration component $roll_r$ is calculated as follows.

$$roll_r = LPF(\Sigma ROLL') \tag{23}$$

That is, this component is obtained by calculation of attaining a low-band component LPF ($\Sigma ROLL''$) from the integration $\Sigma ROLL'$ of the camera motion prediction amount ROLL'.

The actual vibration component $x_r$ is calculated as follows.

$$x_r = HPF(\Sigma X') \tag{24}$$

That is, this component is obtained by calculation of attaining a high-band component HPF ($\Sigma X'$) from the integration $\Sigma X'$ of the camera motion prediction amount X'.

Also, the actual vibration component $y_r$ is calculated as follows.

$$y_r = HPF(\Sigma Y') \tag{25}$$

That is, this component is obtained by calculation of attaining a high-band component HPF ($\Sigma Y'$) from the integration $\Sigma Y'$ of the camera motion prediction amount Y'.

Further, the actual vibration component $z_r$ is calculated as follows.

$$z_r = HPF(\Sigma Z') \tag{26}$$

That is, this component is obtained by extracting a high-band component HPF ($\Sigma Z'$) from the integration $\Sigma Z'$ of the camera motion prediction amount Z'.

The substituent vibration components $pitch_s$, $roll_s$, and $yaw_s$ shown in the table 1 are calculated as follows.

The substituent vibration component $pitch_s$ is obtained as follows.

$$pitch_s = LPF(\ddot{A}X') \tag{27}$$

That is, this component is obtained by calculation for obtaining a low-band component LPF ($\ddot{A}X'$) from the difference $\ddot{A}X'$ of the camera motion prediction amount X'.

Also, the substituent vibration component $roll_s$ is obtained as follows.

$$roll_s = LPF(X')LPF(YAW') \tag{28}$$

That is, this component is obtained by calculation for obtaining a product of the low-band component LPF (X') of the camera motion prediction amount X' and a low-band component LPF (YAW') of the camera motion prediction amount YAW'.

Further, the substituent vibration component $yaw_s$ is obtained as follows.

$$yaw_s = LPF(YAW') \qquad (29)$$

That is, this component is obtained by calculation for obtaining a low-band component LPF (YAW') of the camera motion prediction amount YAW'.

Further, in the present embodiment, the vibration data is calculated as follows, by taking the sum of the actual vibration data and the substituent vibration data.

$$pitch = pitch_r + pitch_s \qquad (30)$$

$$roll = roll_r + roll_s \qquad (31)$$

$$raw = raw_s \qquad (32)$$

$$x = x_r \qquad (33)$$

$$y = y_r \qquad (34)$$

$$z = z_r \qquad (35)$$

Figure 21:
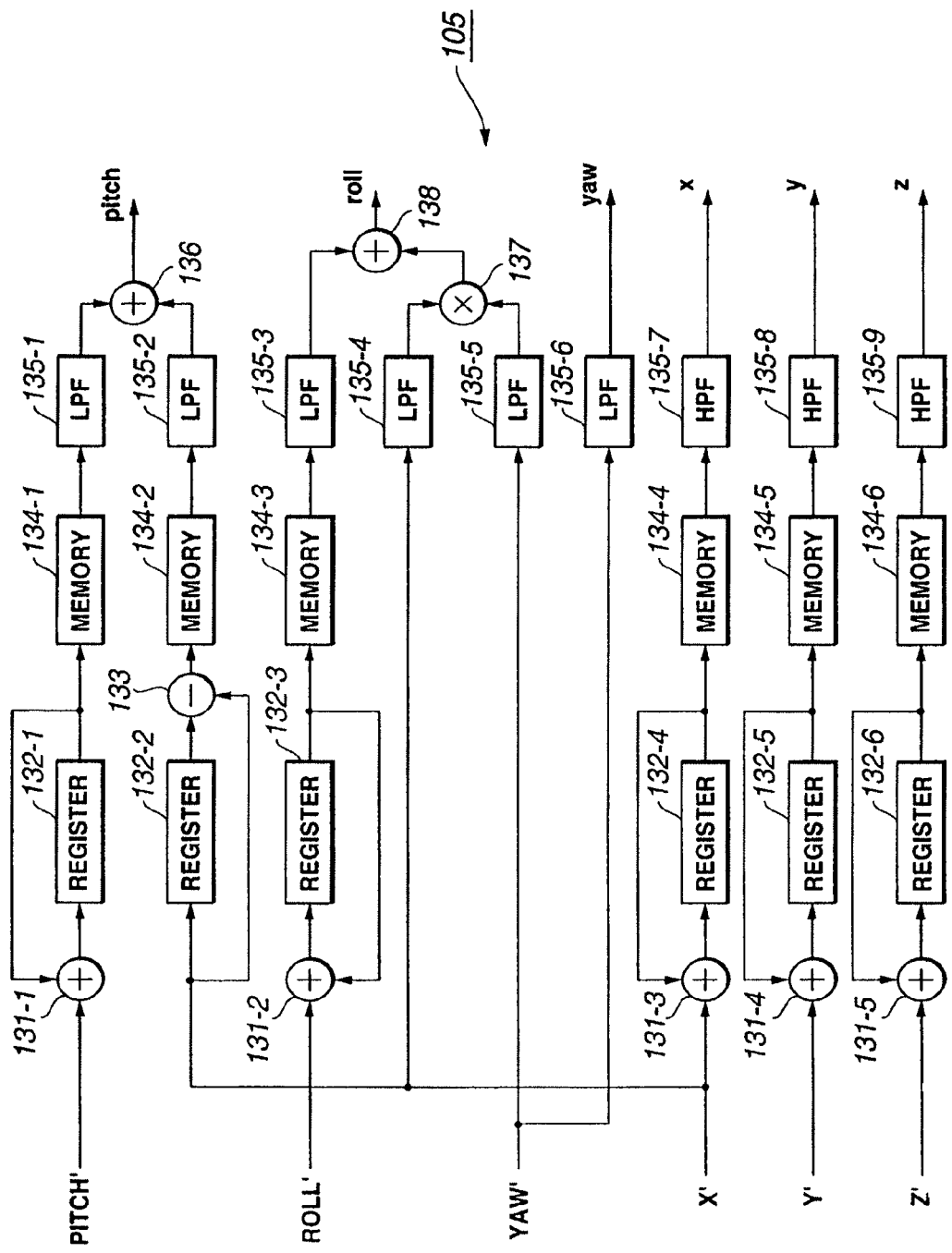
FIG. 21 is a block diagram showing the structure of the vibration data calculator.

To make calculation based on the expressions described above, the vibration data calculator 105 is constructed as shown in FIG. 21. Among the camera motion prediction amounts, the PITCH' is integrated by an adder 131-1 and a register 132-1, and is stored into a memory 134-1. From the data stored in the memory 134-1, the low-band component is extracted by a low pass filter (LPF) 135-1. The calculation of the expression (22) is thus carried out to generate the actual vibration component $pitch_r$. The actual vibration component $pitch_r$ thus generated is supplied to the adder 136.

The adder 136 is also supplied with the substituent vibration data $pitch_s$ shown in the expression (27). That is, a subtracter 133 subtracts the value held by a register 132-2 from the component X' among the camera motion prediction amounts, and supplies the difference to a memory 134-2 to store it. A low pass filter (LPF) 135-2 extracts a low-band component from the difference data stored in the memory 134-2, and outputs it as the substituent vibration data $pitch_s$ to an adder 136.

The adder 136 adds the substituent vibration component $pitch_s$ supplied from the low pass filter (LPF) 135-2 and the actual vibration component $pitch_r$ supplied from the low pass filter (LPF) 135-1, to perform the calculation of the expression (30). The adder 136 outputs the calculation result as the pitch.

Among the camera motion prediction amounts, the component ROLL' is integrated by an adder 131-2 and a register 132-3, and is supplied to a memory 134-3 to store is. A low pass filter (LPF) 135-3 extracts the low-band component of the data stored into the memory 134-3, and outputs it to an adder 138. In this manner, the calculation of the expression (23) is carried out.

The adder 138 is also supplied with the substituent vibration component $roll_s$ shown in the expression (28). That is, a low pass filter (LPF) 135-4 extracts the low-band component of the component X', and outputs it to a multiplier 137. The low pass filter 135-5 extracts the low-band component of the component YAW', and outputs it to a multiplier 137. The multiplier 137 multiplies the output of the low pass filter 135-4 and the output of the low pass filter (LPF) 135-5, to carry out the calculation indicated by the expression (28). The multiplier 137 outputs the calculation result to the adder 138. The adder 138 adds the output of the low pass filter (LPF) 135-3 and the output of the multiplier 137, to carry out the calculation of the expression (31). The adder 138 outputs the calculation result as the roll.

A low pass filter 135-6 extracts the low-band component of the component YAW' of the camera motion prediction amount, to carry out the calculation indicated by the expression (29). The low pass filter 135-6 outputs the calculation result as the yaw according to the expression (32).

Among the camera motion prediction amounts, the component X' is integrated by an adder 131-3 and a register 132-4, and the result is supplied to a memory 134-4 to store it. A high pass filter (HPF) 135-7 extracts the high-band component from the data stored into the 134-4, to carry out the calculation of the expression (24). The filter 135-7 outputs the calculation result as x according to the expression (33).

The component Y' of the camera motion prediction amounts is integrated by an adder 131-4 and a register 132-5, and the result is supplied to the memory 134-5 to store it. A high pass filter (HPF) 135-8 extracts the high-band component of the data stored into the memory 134-5, to carry out the calculation of the expression (25). The filter 135-8 outputs the calculation result as y according to the expression (34).

Among the camera motion prediction amounts, the component Z' is integrated by an adder 131-5 and a register 132-6, and the result is supplied to a memory 134-6 to store it. A high pass filter (HPF) 135-9 extracts the high-band component of the data stored into the memory 134-6, to carry out the calculation of the expression (26). The filter 135-8 outputs the calculation result as z according to the expression (35).

Figure 22:
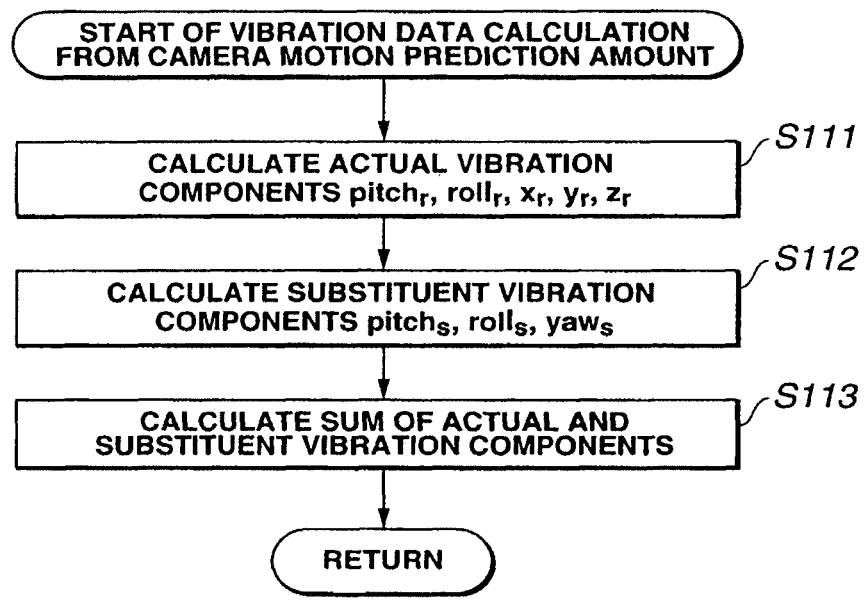
FIG. 22 is a flowchart explaining the operation of the vibration data calculator.

Next, operation of the vibration data calculator 105 will be explained with reference to the flowchart shown in FIG. 22. In the step S111, the actual vibration components $pitch_r$, $roll_r$, $x_r$, $y_r$, and $z_r$ are calculated. That is, the component PITCH' among the camera motion prediction amounts is integrated by the adder 131-1 and the register 132-1 and is stored into the memory 134-1. The low-band component is extracted from the data stored into the memory 134-1, by the low pass filter (LPF) 135-1, and is outputted as the component pitch, to the adder 136.

The camera motion prediction amount ROLL' is integrated by the adder 131-2 and the register 132-3 and is stored into the memory 134-3. The low pas filter (LPF) 135-3 extracts the low-band component from the data stored into the memory 134-3, and outputs it as the component roll, to the adder 138.

The component X' of the camera motion prediction amounts is integrated by the adder 131-1 and the register 132-4 and is stored into the memory 134-4. The high pass filter (HPF) 135-7 extracts the high-band component of the data stored into the memory 134-4 and sets it as the component $x_r$.

The component Y' among the camera motion prediction amounts is integrated by the adder 131-4 and the register 132-5 and is stored into the memory 134-5. The high pass filter (HPF) 135-8 extracts the high-band component from the data stored into the memory 134-5 and sets it as the component $y_r$.

The component Z' among the camera motion prediction amounts is integrated by the adder 131-5 and the register 132-6 and is stored into the memory 134-6. The high pass filter (HPF) 135-9 extracts the high-band component from the data stored into the memory 134-6 and sets it as the component $z_r$.

Next, in the step S112, the substituent vibration components $pitch_s$, $roll_s$, and $yaw_s$ are calculated.

That is, the subtracter 133 subtracts the past component supplied by the register 132-2 from the component X' among the current camera motion prediction amounts, and supplies it to the memory 134-2 to store it. The low pass filter (LPF) 135-2 outputs the low-band component of the data stored in the memory 134-2, as the substituent vibration component pitch$_s$, to the adder 136.

The low pass filter (LPF) 135-4 extracts the low-band component of the component X' among the camera motion prediction amounts. The low pass filter (LPF) 135-5 extracts the low-band component of the component YAW' among the camera motion prediction amounts. The multiplier 137 multiplies the outputs of the low pass filters (LPF) 135-4 and 135-6, to generate the component roll$_s$. The multiplier 137 outputs the result to the adder 138.

The low pass filter (LPF) 135-6 extracts the low-band component of the component YAW' among the camera motion prediction amounts and sets it as the component yaw$_s$.

Further, in the step S113, the sum of the actual vibration data calculated in the step S111 and the substituent vibration data generated in the step S112 is calculated. That is, the adder 136 adds the actual vibration component data pitch$_r$, supplied from the low pass filter (LPF) 135-1 and the substituent vibration component data pitch$_s$ supplied from the low pass filter (LPF) 135-2, and outputs the result as the component pitch of the vibration data.

The adder 138 adds the actual vibration component roll$_r$ supplied by the low pass filter (LPF) 135-3 and the substituent vibration component data roll$_s$ supplied by the multiplier 137, and outputs the result as the component roll of the vibration data.

The low pass filter (LPF) 135-6 outputs the extracted substituent vibration component data yaw$_s$ directly as the component yaw of the vibration data. The high pass filter (HPF) 135-7 to 135-9 output the generated actual vibration components x$_r$, y$_r$, and z$_r$ respectively as the components x, y, and z of the vibration data.

In the manner as described above, the vibration data generated by the vibration data generation apparatus 2 is supplied to the drive control apparatus 5. Also, the image used by the vibration data generation apparatus 2 to generate the vibration data is supplied to the image presentation apparatus 3. The image presentation apparatus 3 and the drive control apparatus 5 are controlled by the synchronization control apparatus 7, so as to operate in synchronization with each other. The image presentation apparatus 3 displays the supplied image on the screen 4. Also, the drive control apparatus 5 drives the seat 6, based on the supplied vibration data.

Figure 23:
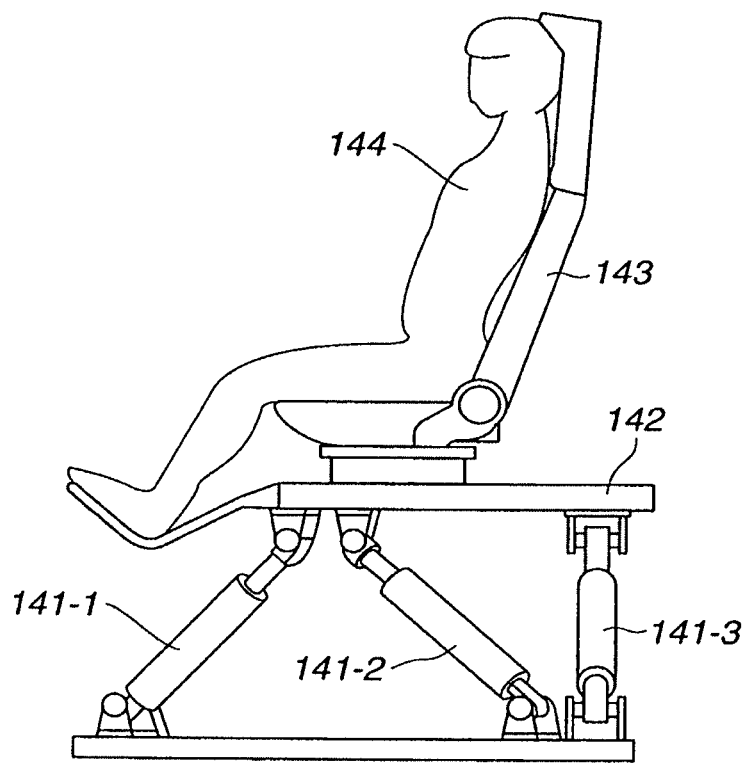
FIG. 23 is a side view of a seat in the live-feeling experience apparatus.
Figure 24:
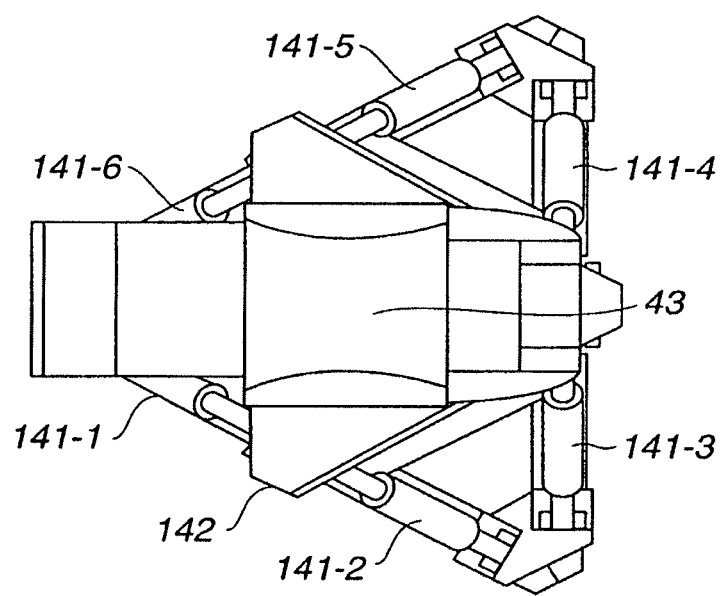
FIG. 24 is a plan view of the seat.

The specific structure of the seat 6 driven by the drive control apparatus 5 is shown in FIGS. 23 and 24. FIG. 23 is a side view of the seat 6, and FIG. 24 is a top view of the seat 6.

The seat 6 comprises six pistons 141-1 to 141-6 as actuators. A seat base 142 is supported by the pistons 141-1 to 141-6. A chair 143 is fixed to the seat base 142, and an audience 144 sits on the chair 143. The pistons 141-1 to 141-6 can move to expand and contract along their own center axes, respectively. The pistons 141-1 to 141-6 are driven by the drive control apparatus 5 so as to expand and contract, in accordance with vibration data generated by the vibration data generation apparatus 2. As a result, the seat base 142 vibrates, and further, the chair 143 fixed to the seat base 142 vibrates.

In this manner, an observer who sits on the seat 6 and watches the image displayed on the screen can experience a live feeling as if the observer were riding on a vehicle which has picked up the image displayed on the screen 4.

Figure 25:
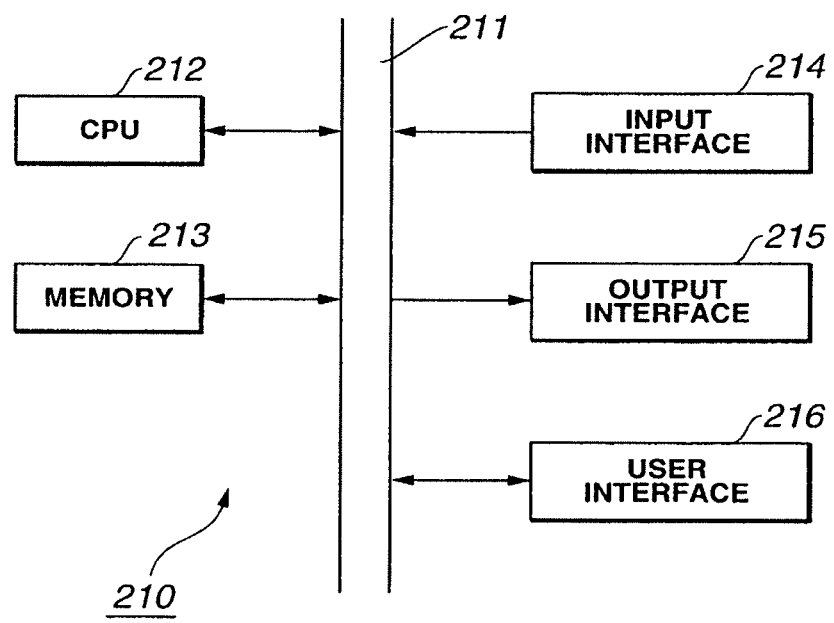

The learning processing for obtaining an image vibration data relationship coefficients in the image/vibration data relationship learning apparatus 1 and various calculation processing for obtaining camera estimation amounts to generate vibration data can be executed by a general computer system 210 constructed by a CPU (Central Processing Unit) 212, a memory 213, an input interface 214, a user interface 215, and an output interface 216, which are connected to a bus 211 as shown in FIG. 25. The computer program for executing the processing as described above is recorded on recording media which are provided for users. The recording media include information recording media such as magnetic disks, CD-ROMs, and the like, as well as distribution media such as Internet, digital satellite networks, and the like.

As has been described above, according to the present invention, camera motion estimation amounts concerning a video camera which has picked up an image are calculated, and a camera motion amount expressing an amount which the video camera moved is calculated from vibration data obtained by a sensor. The correspondence between the camera motion estimation amounts and the camera motion amount is learned as a coefficient of a linear primary combination. Therefore, existing image assets can be utilized to generate vibration data which can let a user experience a live feeling as if the user were riding on a vehicle on which the image was picked up. Also, the camera motion estimation amounts are calculated. The camera motion estimation amounts and previously stored coefficients are subjected to a linear primary combination, thereby to calculate camera motion prediction amounts. Based on the calculated camera motion prediction amounts, vibration data used to drive a seat is calculated. Therefore, it is possible to generate simply and securely vibration data, based on existing images.

The invention claimed is:

1. A learning apparatus comprising:
camera motion estimation information detection means for detecting camera motion estimation information from a desired image signal picked up by a video camera; and
coefficient generation means for generating a conversion coefficient for generating camera motion prediction information for learning expressing motion of the video camera which picked up an arbitrary image signal, from the arbitrary image signal, based on (a) sensor signal expressing physical motion of the video camera, which is obtained by a sensor for detecting physical motion, at the same time when the desired image signal was picked up, and (b) the camera motion estimation information;
wherein the desired image signal is a signal obtained for learning processing that is performed automatically by a learning section of said apparatus.

2. The apparatus according to claim 1, wherein the camera motion estimation includes a motion vector detection section for detecting a motion vector from the inputted image signal, a motion center detection section for detecting a motion center, based on the motion vector, and a camera motion estimation information detection section for detecting the camera motion estimation information, based on the motion vector and the motion center.

3. The apparatus according to claim 2, wherein the motion vector detection section detects the motion vector, with respect to a plurality of preset representative points of the inputted image signal.

4. The apparatus according to claim 2, comprising an acceleration sensor as the sensor.

5. The apparatus according to claim 2, comprising an angular speed sensor as the sensor.

6. The apparatus according to claim 2,
wherein the camera motion estimation information detection means generates the camera motion estimation information which is constructed by information of plural kinds of motions.

7. A learning method comprising the steps of:
detecting camera motion estimation information from a desired image signal picked up by a video camera; and
generating a conversion coefficient for generating camera motion prediction information for learning expressing motion of the video camera which picked up an arbitrary image signal, from the arbitrary image signal, based on (a) sensor signal expressing physical motion of the video camera, which is obtained by a sensor for detecting physical motion, at the same time when the desired image signal was picked up, and (b) the camera motion estimation information;
wherein the desired image signal is a signal obtained for learning processing that is performed automatically by a learning section.

8. The method according to claim 7, wherein the step of detecting the camera motion estimation information includes a step of detecting a motion vector from the inputted image signal, a step of detecting a motion center, based on the motion vector, and a step of detecting the camera motion estimation information, based on the motion vector and the motion center.

9. The method according to claim 8, wherein in the step of detecting the motion vector, the motion vector is detected with respect to a plurality of preset representative points of the inputted image signal.

10. The method according to claim 8, wherein in the step of generating the conversion coefficient, the conversion coefficient is generated, based on camera motion information expressing physical motion of the video camera, which was obtained by an acceleration sensor as the sensor.

11. The method according to claim 8, wherein in the step of generating the conversion coefficient, the conversion coefficient is generated, based on camera motion information expressing physical motion of the video camera, which was obtained by an angular speed sensor as the sensor.

12. The method according to claim 8,
wherein in the step of detecting the camera motion estimation information, the camera motion estimation information which is constructed by information of plural kinds of motions.

13. A non-transitory computer recording medium encoded with a computer program for letting a computer execute learning processing, the program comprising the steps of:
detecting camera motion estimation information from a desired image signal picked up by a video camera; and
generating a conversion coefficient for generating camera motion prediction information for learning expressing motion of the video camera which picked up an arbitrary image signal, from the arbitrary image signal, based on (a) sensor signal expressing physical motion of the video camera, which is obtained by a sensor for detecting physical motion, at the same time when the desired image signal was picked up, and (b) the camera motion estimation information;
wherein the desired image signal is a signal obtained for learning processing that is performed automatically by a learning section.

14. The medium according to claim 13, wherein the step of detecting the camera motion estimation information includes a step of detecting a motion vector from the inputted image signal, a step of detecting a motion center, based on the motion vector, and a step of detecting the camera motion estimation information, based on the motion vector and the motion center.

15. The medium according to claim 13, wherein in the step of detecting the motion vector, the motion vector is detected with respect to a plurality of preset representative points of the inputted image signal.

16. The medium according to claim 13, wherein in the step of generating the conversion coefficient, the conversion coefficient is generated, based on camera motion information expressing physical motion of the video camera, which was obtained by an acceleration sensor as the sensor.

17. The medium according to claim 13, wherein in the step of generating the conversion coefficient, the conversion coefficient is generated, based on camera motion information expressing physical motion of the video camera, which was obtained by an angular speed sensor as the sensor.

18. The medium according to claim 13,
wherein in the step of generating the camera motion estimation information, camera motion estimation information which is constructed by information of plural kinds of motions.

19. An apparatus comprising:
memory means for storing relationship information generated by learning based on camera motion estimation information for learning expressing motion of a video camera, which is detected by a desired image signal picked up by the video camera, and camera motion information for learning expressing physical motion of the video camera, which was obtained by a sensor for detecting physical motion at the same time when the desired image signal was picked up by the video camera;
camera motion estimation information detection means for detecting camera motion estimation information with respect to an inputted image signal, from the inputted image signal; and
camera motion prediction information generation means for generating camera motion prediction information with respect to the inputted image signal, based on the camera motion estimation information of the inputted image signal detected by the camera motion estimation information detection means and the relationship information, wherein a motion signal causes a user to experience a live feeling as if said user were riding in an image picked up by said video camera;
wherein the camera motion estimation information for learning is generated based on (a) one or more motion vectors in the desired image signal and (b) the camera motion estimation information of the inputted image signal is generated based on a motion vector in the input image signal.

20. A learning apparatus comprising:
camera motion estimation information detection means for detecting camera motion estimation information from a desired image signal picked up by a video camera; and
coefficient generation means for generating a conversion coefficient for generating camera motion prediction information expressing motion of the video camera which picked up an arbitrary image signal, from the arbitrary image signal, based on (a) sensor signal expressing physical motion of the video camera, which is obtained by a sensor for detecting physical motion, at the same time when the desired image signal was picked up, and (b) the camera motion estimation information, wherein a motion signal causes a user to experience a live feeling as if said user were riding in an image picked up by said video camera;

wherein the camera motion estimation information for learning is generated based on (1) one or more motion vectors in the desired image signal and (2) the camera motion estimation information of an inputted image signal is generated based on a motion vector in the input image signal.

21. An information processing method comprising the steps of;

generating relationship information generated by learning based on (a) camera motion estimation information expressing motion of a video camera, which is detected by a desired image signal picked up by the video camera, and (b) camera motion information expressing physical motion of the video camera, which was obtained by a sensor for detecting physical motion at the same time when the desired image signal was picked up by the video camera;

detecting camera motion estimation information with respect to an inputted image signal, from the inputted image signal; and generating camera motion prediction information with respect to the inputted image signal, based on (1) the camera motion estimation information detected and (2) the relationship information, wherein a motion signal causes a user to experience a live feeling as if said user were riding in an image picked up by said video camera;

wherein the camera motion estimation information for learning is generated based on (i) one or more motion vectors in the desired image signal and (ii) the camera motion estimation information of the inputted image signal is generated based on a motion vector in the input image signal.

22. A learning method comprising the steps of:

detecting camera motion estimation information from a desired image signal picked up by a video camera; and generating a conversion coefficient for generating camera motion prediction information expressing motion of the video camera which picked up an arbitrary image signal, from the arbitrary image signal, based on (a) sensor signal expressing physical motion of the video camera, which is obtained by a sensor for detecting physical motion, at the same time when the desired image signal was picked up, and (b) the camera motion estimation information, wherein a motion signal causes a user to experience a live feeling as if said user were riding in an image picked up by said video camera;

wherein the camera motion estimation information for learning is generated based on (1) one or more motion vectors in the desired image signal and (2) the camera motion estimation information of an inputted image signal is generated based on a motion vector in the input image signal.

23. A non-transitory computer program recording medium encoded with a computer program for letting a computer execute information processing, the program comprising the steps of:

generating relationship information generated by learning based on (a) camera motion estimation information expressing motion of a video camera, which is detected by a desired image signal picked up by the video camera, and (b) camera motion information expressing physical motion of the video camera, which was obtained by a sensor for detecting physical motion at the same time when the desired image signal was picked up by the video camera;

detecting camera motion estimation information with respect to an inputted image signal, from the inputted image signal; and generating camera motion prediction information with respect to the inputted image signal, based on (1) the camera motion estimation information detected and (2) the relationship information, wherein a motion signal causes a user to experience a live feeling as if said user were riding in an image picked up by said video camera;

wherein the camera motion estimation information for learning is generated based on (i) one or more motion vectors in the desired image signal and (ii) the camera motion estimation information of the inputted image signal is generated based on a motion vector in the input image signal.

24. A non-transitory recording medium encoded with a computer program for letting a computer execute learning processing, the program comprising the steps of:

detecting camera motion estimation information from a desired image signal picked up by a video camera; and generating a conversion coefficient for generating camera motion prediction information expressing motion of the video camera which picked up an arbitrary image signal, from the arbitrary image signal, based on (a) sensor signal expressing physical motion of the video camera, which is obtained by a sensor for detecting physical motion, at the same time when the desired image signal was picked up, and (b) the camera motion estimation information, wherein a motion signal causes a user to experience a live feeling as if said user were riding in an image picked up by said video camera;

wherein the camera motion estimation information for learning is generated based on (1) one or more motion vectors in the desired image signal and (2) the camera motion estimation information of an inputted image signal is generated based on a motion vector in the input image signal.

25. An information processing method comprising the steps of:

detecting from an inputted image signal camera motion information with respect to the inputted image signal; and detecting camera motion prediction information with respect to the inputted image signal, based on (a) the detected camera motion information and (b) relationship information generated by learning based on (1) camera motion estimation information that expresses motion of a video camera, which is detected by a desired image signal picked up by the video camera, and (2) camera motion information that expresses physical motion of the video camera, obtained by a sensor for detecting physical motion at the same time that the desired image signal was picked up, wherein a motion signal causes a user to experience a live feeling as if said user were riding in an image picked up by said video camera;

wherein the camera motion estimation information for learning is generated based on (i) one or more motion vectors in the desired image signal and (ii) the camera motion estimation information of the inputted image signal is generated based on a motion vector in the input image signal.

26. A non-transitory computer program recording medium encoded with a computer program for controlling a computer to execute information processing by:

detecting from an inputted image signal camera motion information with respect to the inputted image signal; and detecting camera motion prediction information with respect to the inputted image signal, based on (a) the detected camera motion information and (b) relationship information generated by learning based on (1) camera motion estimation information that expresses motion of a video camera, which is detected by a desired image signal picked up by the video camera, and (2) camera motion information that expresses physical motion of the video camera, obtained by a sensor for detecting physical motion at the same time that the desired image signal was picked, wherein a motion signal causes a user to experience a live feeling as if said user were riding in an image picked up by said video camera;

wherein the camera motion estimation information for learning is generated based on (i) one or more motion vectors in the desired image signal and (ii) the camera motion estimation information of the inputted image signal is generated based on a motion vector in the input image signal.

* * * * *